US007647298B2

(12) United States Patent
Adya et al.

(10) Patent No.: US 7,647,298 B2
(45) Date of Patent: Jan. 12, 2010

(54) GENERATION OF QUERY AND UPDATE VIEWS FOR OBJECT RELATIONAL MAPPING

(75) Inventors: Atul Adya, Redmond, WA (US); Philip A. Bernstein, Bellevue, WA (US); Sergey Melnik, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 307 days.

(21) Appl. No.: 11/724,991

(22) Filed: Mar. 16, 2007

(65) Prior Publication Data

US 2007/0226203 A1    Sep. 27, 2007

Related U.S. Application Data

(60) Provisional application No. 60/785,457, filed on Mar. 23, 2006.

(51) Int. Cl.
*G06F 7/00* (2006.01)
*G06F 17/00* (2006.01)
*G06F 17/30* (2006.01)

(52) U.S. Cl. .................. 707/2; 707/4; 707/104.1
(58) Field of Classification Search .............. 707/1–4, 707/100–102, 6, 104.1
See application file for complete search history.

(56) References Cited

U.S. PATENT DOCUMENTS

| | | | |
|---|---|---|---|
| 7,152,074 B2 * | 12/2006 | Dettinger et al. | 707/102 |
| 7,225,189 B1 * | 5/2007 | McCormack et al. | 707/10 |
| 7,296,028 B1 * | 11/2007 | Ivanova | 707/100 |
| 7,403,956 B2 * | 7/2008 | Vaschillo et al. | 707/104.1 |
| 7,546,286 B2 * | 6/2009 | Dickinson et al. | 707/2 |
| 2006/0173865 A1 * | 8/2006 | Fong | 707/100 |
| 2006/0195460 A1 | 8/2006 | Nori et al. | 707/100 |
| 2006/0195476 A1 | 8/2006 | Nori et al. | 707/104.1 |
| 2006/0195477 A1 | 8/2006 | Deem et al. | 707/104.1 |

OTHER PUBLICATIONS

Atkinson, M. P. et al., "Types and Persistence in Database Programming Languages," *ACM Comput. Surv.*, 1987, 19(2),105-190.
Bancilhon, F. et al., "Update Semantics of Relational Views," *ACM Transactions on Database Systems*, 1981, 6(4), 557-575.
Barsalou, T. et al., "Updating Relational Databases through Object-Based Views," *SIGMOD*, 1991, 1-14.
Bernstein, P. A., "Applying Model Management to Classical Meta-Data Problems," *Conference on Innovative Data Systems Research (CIDR)*, 2003, 12 pages.

(Continued)

*Primary Examiner*—Don Wong
*Assistant Examiner*—Merilyn P Nguyen
(74) *Attorney, Agent, or Firm*—Woodcock Washburn LLP

(57) ABSTRACT

A data access architecture may includes a mapping architecture for mapping data as may be used by an application to data as persisted in a database. Such a mapping architecture uses two types of "mapping views"—one for translating queries and the other for translating updates. A mechanism is provided that automatically generates query and update views from high-level mapping specifications. A validation may be performed to ensure that a mapping specification, when used in conjunction with a mapping architecture, allows data to "roundtrip" from the application to the database, without loss of data.

8 Claims, 13 Drawing Sheets

OTHER PUBLICATIONS

Blakeley, J. A. et al., "Efficiently Updating Materialized Views," *ACM SIGMOD International Conference on Management of Data*, 1986, 61-71.

Braganholo, V. P. et al., "From XML View Updates to Relational View Updates: Old Solutions to a New Problem," *International Conference on Very Large Data Bases (VLDB)*, Toronto, Canada, 2004, 12 pages.

Carey, M. J. et al., "Of Objects and Databases: A Decade of Turmoil," *International Conference on Very Large Data Bases (VLDB)*, Mombai, India, 1996.

Carey, M. J. et al., "O-O, What Have They Done to DB2?" *VLDB*, 1999, 542-553.

Chen, P., "The Entity-Relationship Model—Toward a Unified View of Data," *ACM Trans. on Database Syst.*, 1976, 1(1), 9-36.

Cook, W. R. et al., "Integrating Programming Languages & Databases: What's the Problem?" Draft at http://www.cs.utexas.edu/☐wcook/Drafts/2005/PLDBProblem.pdf, Oct. 2005, 1-18.

Dayal, U. et al., "On the Updatability of Relational Views," *International Conference on Very Large Data Bases (VLDB)*, 1978, 368-377.

Di Paola, R. A., "The Recursive Unsolvability of the Decision Problem for the Class of Definite Formulas," *J. ACM*, 1969, 16(2), 324-327.

Fagin, R. et al., "Data exchange: semantics and query answering," *Theor. Comput. Sci.*, 2005, 336, 89-124.

Fagin, R. et al., "Composing Schema Mappings: Second-Order Dependencies to the Rescue," *PODS*, Paris, France, 2004, 12 pages.

Foster, J. N. et al., "Combinators for Bi-Directional Tree Transformations: A Linguistic Approach to the View Update Problem," *POPL*, 2004/2005, article and slides, 1-75 & 37 pages.

Fowler, M., "Patterns of Enterprise Application Architecture" Addison-Wesley, Boston, MA, 2002, 533 pages.

Gottlob, G. et al., "Properties and Update Semantics of Consistent Views," *ACM Transactions on Database Systems*, 1988, 13(4), 486-524.

Grimes, S., "Object/Relational Reality Check," *Database Programming & Design (DBPD)*, Jul. 1998, 11(7), 8 pages.

Gupta, A. et al., "Maintenance of Materialized Views: Problems, Techniques, and Applications," *IEEE Data Eng. Bull.*, 1995, 18(2), 3-18.

Halevy, A., "Answering queries using views: A survey," *VLDB J.*, 2001, 10(4), 270-294.

IBM, "IBM Rational Data Architect," www.ibm.com/software/data/integration/rda/, downloaded 2007, 3 pages.

Keene, C., "Data Services for Next-Generation SOAs," *SOA WebServices Journal*, 2004, http://soa.sys-con.com/read/4723.htm, 4(12), 4 pages.

Keller, A. M. et al., "Persistence Software: Bridging Object-Oriented Programming and Relational Databases," *SIGMOD*, 1993, 1-6.

Kotidis, Y. et al., "Updates Through Views: A New Hope," *Intl. Conf. on Data Engineering (ICDE)*, 2006, 1-12.

Krishnamurthy, V. et al., "Bringing Object-Relational Technology to Mainstream," *SIGMOD*, 1999, 513-514.

LLBLGen Pro, "LLBLGen Pro O/R Mapper," Generator. www.llblgen.com, downloaded 2007, 4 pages.

Microsoft Corp., "Microsoft BizTalk Server," www.microsoft.com/biztalk/, updated 2007, 3 pages.

Microsoft Corporation, "Common Language Runtime (CLR)," http://msdn2.microsoft.com/en-us/library/ms131047.aspx, 2005, 6 pages.

Microsoft Corporation, "The LINQ Project," http://msdn.microsoft.com/library/en-us/dndotnet/html/linqprojectovw.asp, updated 2007, 3 pages.

Nash, A. et al., "Composition of Mappings Given by Embedded Dependencies," *PODS*, 2005, 12 pages.

Object Management Group, Inc., "Unified Modeling Language," http://www.uml.org/, 2005, 4 pages.

Oracle Technology Network, "Oracle TopLink," www.oracle.com/technology/products/ias_toplink/, downloaded 2007, 2 page.

Pierce, B. C., "The Weird World of Bi-Directional Programming," *ETAPS Invited Talk*, Slides at http://www.cis.upenn.edu/~bcpierce/papers/lensesetapsslideshttp://www.cis.upenn.edu/☐bcpierce/papers/lensesetapsslides.pdf, Mar. 2006, 140 pages.

Roth, M. et al., "XML Mapping Technology: Making Connections in an XML-Centric World," *IBM Systems J.*, 2006, 45(2), 389-409.

Segoufin, V., "Views and Queries: Determinacy and Rewriting," *PODS*, 2005, 12 pages.

Zhang, W. et al., "The Real Benefits of Object-Relational DB-Technology for Object-Oriented Software Development," *BNCOD*, 2001, 89-104.

Gupta, A. et al., "Materialized Views: Techniques, Implementations, and Applications," *The MIT Press*, 1999.

\* cited by examiner

| # | | |
|---|---|---|
| 1 | SELECT o.Id, o.AccountNum<br>FROM ESalesOrders o<br>WHERE o IS OF ESalesOrder | = | SELECT SalesOrderId, AccountNum<br>FROM SSalesOrders<br>WHERE IsOnline = "true" |
| 2 | SELECT o.Id, o.AccountNum, o.Tax<br>FROM ESalesOrders o<br>WHERE o IS OF EStoreSalesOrder | = | SELECT SalesOrderId, AccountNum, Tax<br>FROM SSalesOrders<br>WHERE IsOnline = "false" |
| 3 | SELECT o.EOrder.Id, o.ESalesPerson.Id<br>FROM ESalesPersonOrders o | = | SELECT SalesOrderId, SalesPersonId<br>FROM SSalesOrders |
| 4 | SELECT p.Id, p.Bonus<br>FROM ESalesPersons p | = | SELECT SalesPersonId, Bonus<br>FROM SSalesPersons |
| 5 | SELECT p.Id, p.Title, p.HireDate<br>FROM ESalesPersons p | = | SELECT EmployeeId, Title, HireDate<br>FROM SEmployees |
| 6 | SELECT p.Id, p.Name,<br>p.Contact.Email, p.Contact.Phone<br>p | = | SELECT ContactId, Name, Email, Phone<br>FROM SContacts |

*Fig. 5*

Query views

Update views

```
ESalesOrders =                                              QV₁
SELECT
   CASE WHEN T.IsOnline = True
        THEN ESalesOrder(T.SalesOrderId, T.AccountNum)
        ELSE ESstoreSalesOrder(T.SalesOrderId,
                               T.AccountNum, T.Tax)
   END
FROM SSalesOrders AS T ESalesPersonOrders =                                        QV₂
SELECT ESalesPersonOrder(
       CreateRef(ESalesOrders, T.SalesOrderId),
       CreateRef(ESalesPersons, T.SalesPersonId))
FROM SSalesOrders AS T
```

```
SSalesOrders =                                              UV₁
SELECT o.Id, po.Id, o.AccountNum,
       TREAT(o AS EStoreSalesOrder).Tax AS Tax,
       CASE WHEN o IS OF ESalesOrder THEN TRUE ELSE FALSE END
       AS IsOnline
FROM ESalesOrders AS o
INNER JOIN ESalesPersonOrders AS po
ON o.SalesOrderId = Key(po.EOrder).Id
```

Query views

Update views

```
ESalesPersons =                                             QV₃
SELECT ESalesPerson(p.SalesPersonId, p.Bonus,
                    e.Title, e.HireDate,
                    c.Name, Contact(c.Email, c.Phone))
FROM SSalesPersons AS p, SEmployees AS e, SContacts AS c
WHERE p.SalesPersonId = e.EmployeeId
AND e.EmployeeId = c.ContactId
```

```
SSalesPersons =                                             UV₂
SELECT p.Id, p.Bonus FROM ESalesPersons AS p SEmployees =                                                UV₃
SELECT p.Id, p.Title, p.HireDate FROM ESalesPersons AS p SContacts =                                                 UV₄
SELECT p.Id, p.Name, p.Contact.Email, p.Contact.Phone
FROM ESalesPersons AS p
```

*Fig. 6*

GENERATION OF QUERY AND UPDATE VIEWS FOR OBJECT RELATIONAL MAPPING

CROSS REFERENCE TO RELATED APPLICATIONS

This application claims priority to U.S. Provisional Application 60/785,457, "Generation of Query and Update Views for Object Relational Mapping," filed Mar. 23, 2006.

BACKGROUND

Bridging applications and databases is a longstanding problem. In 1996, Carey and DeWitt outlined why many technologies, including object-oriented databases and persistent programming languages, did not gain wide acceptance due to limitations in query and update processing, transaction throughput, and scalability. They speculated that object-relational (O/R) databases would dominate in 2006. Indeed, DB2® and Oracle® database systems include a built-in object layer that uses a hardwired O/R mapping on top of a conventional relational engine. However, the O/R features offered by these systems appear to be rarely used for storing enterprise data, with the exception of multimedia and spatial data types. Among the reasons are data and vendor independence, the cost of migrating legacy databases, scale-out difficulties when business logic runs inside the database instead of the middle tier, and insufficient integration with programming languages.

Since mid 1990's, client-side data mapping layers have gained popularity, fueled by the growth of Internet applications. A core function of such a layer is to provide an updatable view that exposes a data model closely aligned with the application's data model, driven by an explicit mapping. Many commercial products and open source projects have emerged to offer these capabilities. Virtually every enterprise framework provides a client-side persistence layer (e.g., EJB in J2EE). Most packaged business applications, such as ERP and CRM applications, incorporate proprietary data access interfaces (e.g., BAPI in SAP R/3)

One widely used open source Object-Relational Mapping (ORM) framework for Java® is Hibernate®. It supports a number of inheritance mapping scenarios, optimistic concurrency control, and comprehensive object services. The latest release of Hibernate conforms to the EJB 3.0 standard, which includes the Java Persistence Query Language. On the commercial side, popular ORMs include Oracle TopLink® and LLBLGen®. The latter runs on the .NET platform. These and other ORMs are tightly coupled with the object models of their target programming languages.

BEA® recently introduced a new middleware product called the AquaLogic Data Services Platform® (ALDSP). It uses XML Schema for modeling application data. The XML data is assembled using XQuery from databases and web services. ALDSP's runtime supports queries over multiple data sources and performs client-side query optimization. The updates are performed as view updates on XQuery views. If an update does not have a unique translation, the developer needs to override the update logic using imperative code. ALDSP's programming surface is based on service data objects (SDO).

Today's client-side mapping layers offer widely varying degrees of capability, robustness, and total cost of ownership. Typically, the mapping between the application and database artifacts used by ORMs has vague semantics and drives case-by-case reasoning. A scenario-driven implementation limits the range of supported mappings and often yields a fragile runtime that is difficult to extend. Few data access solutions leverage data transformation techniques developed by the database community, and often rely on ad hoc solutions for query and update translation.

Database research has contributed many powerful techniques that can be leveraged for building persistence layers. And yet, there are significant gaps. Among the most critical ones is supporting updates through mappings. Compared to queries, updates are far more difficult to deal with as they need to preserve data consistency across mappings, may trigger business rules, and so on. Updates through database views are intrinsically hard: even for very simple views finding a unique update translation is rarely possible. As a consequence, commercial database systems and data access products offer very limited support for updatable views. Recently, researchers turned to alternative approaches, such as bidirectional transformations.

Traditionally, conceptual modeling has been limited to database and application design, reverse-engineering, and schema translation. Many design tools use UML. Only very recently conceptual modeling started penetrating industry-strength data mapping solutions. For example, the concept of entities and relationships surfaces both in ALDSP and EJB 3.0. ALDSP overlays E-R-style relationships on top of complex-typed XML data, while EJB 3.0 allows specifying relationships between objects using class annotations.

Schema mapping techniques are used in many data integration products, such as Microsoft® BizTalk Server®, IBM® Rational Data Architect®, and ETL® tools. These products allow developers to design data transformations or compile them from mappings to translate e-commerce messages or load data warehouses.

SUMMARY

Systems, methods, and computer readable media are provided for implementation and use of a data access architecture that includes a mapping architecture for mapping data as may be used by an application to data as persisted in a database. In one embodiment, such a mapping architecture uses two types of "mapping views"—one that helps in translating queries and the other that helps in translating updates. A mechanism is provided that automatically generates query and update views from high-level mapping specifications, or "mappings," that may be supplied for example by a user of the system. The generated views satisfy a so-called roundtripping criterion, i.e., they guarantee that the views store and reassemble application data in a lossless fashion. In one aspect, a validation may be performed to ensure that a mapping specification and/or generated view, when used in conjunction with a mapping architecture as described herein, allows data to "roundtrip" from the application to the database, without loss of data. Other exemplary aspects are directed to bypassing a mapping specification in said data access architecture, and error reporting. Further aspects and embodiments of the invention are described below.

BRIEF DESCRIPTION OF THE DRAWINGS

The systems and methods for mapping architecture with incremental view maintenance in accordance with the present invention are further described with reference to the accompanying drawings in which:

FIG. 5 illustrates mapping is represented in terms of queries on the entity schema and the relational schema.

FIG. 6 illustrates bidirectional views—the query and update views—generated by the mapping compiler for the mapping in FIG. 5.

FIG. 13 illustrates a scenario in which a combination of horizontal and vertical partitioning is used to store the inheritance hierarchy shown on the left. Table HR holds portions of instances of Person and Employee, but no Customer instances. The mapping fragment for HR can be specified using OR.

DETAILED DESCRIPTION

Novel Data Access Architecture

Figure 1:
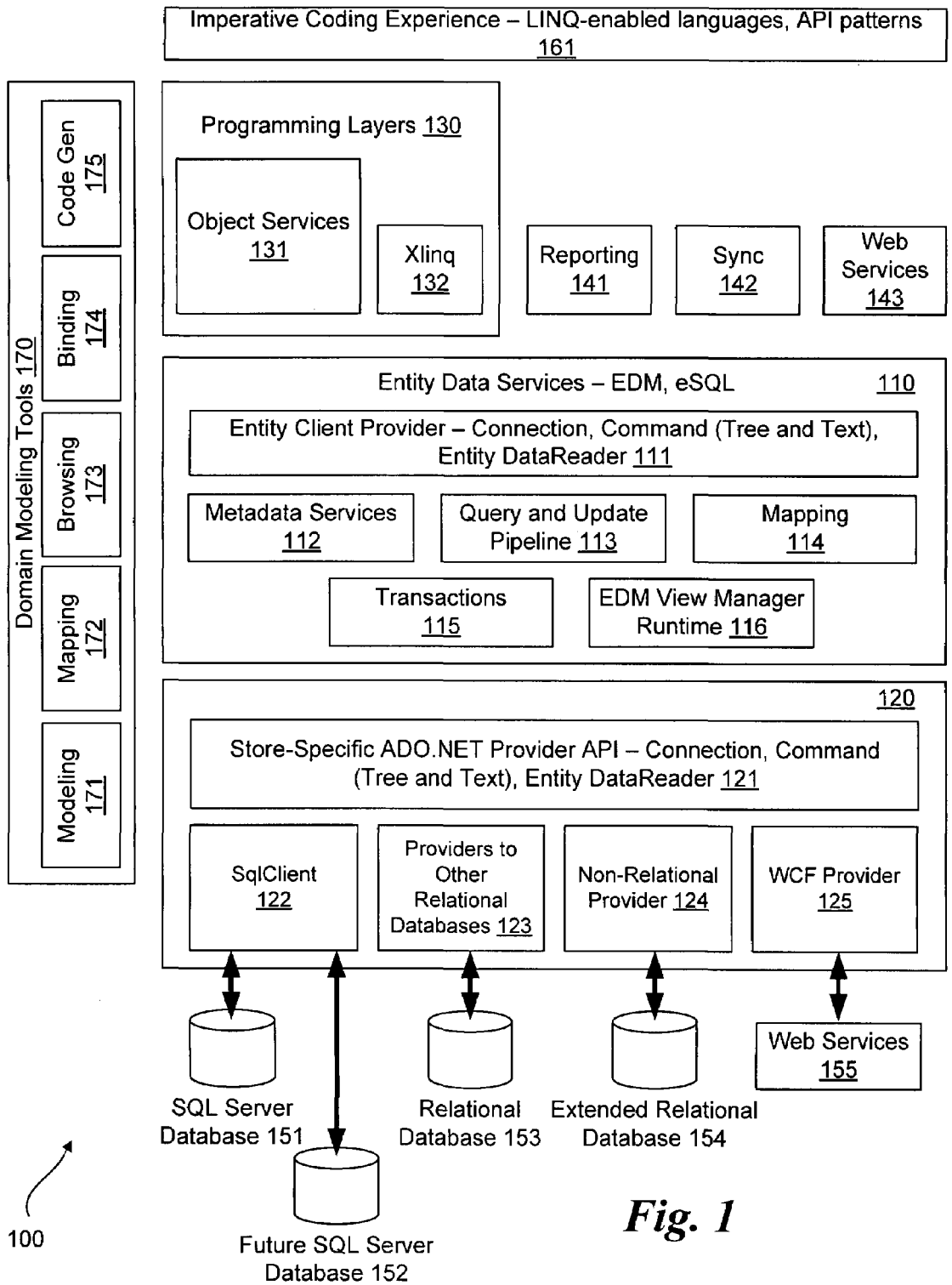
FIG. 1 illustrates an architecture of an exemplary Entity Framework as contemplated herein.

In one embodiment, the innovation may be implemented within and incorporate aspects of a novel data access architecture—an "Entity Framework"—as described in this section. An example of such an Entity Framework is the ADO.NET vNEXT® data access architecture developed by MICROSOFT® Corporation. The following is a general description of the ADO.NET vNEXT data access architecture along with many implementation-specific details which should not be considered necessary to practice the invention.

Overview

Traditional client-server applications relegate query and persistence operations on their data to database systems. The database system operates on data in the form of rows and tables, while the application operates on data in terms of higher-level programming language constructs (classes, structures etc.). The impedance mismatch in the data manipulation services between the application and the database tier was problematic even in traditional systems. With the advent of service-oriented architectures (SOA), application servers and multi-tier applications, the need for data access and manipulation services that are well-integrated with programming environments and can operate in any tier has increased tremendously.

Microsoft's ADO.NET Entity Framework is a platform for programming against data that raises the level of abstraction from the relational level to the conceptual (entity) level, and thereby significantly reduces the impedance mismatch for applications and data-centric services. Aspects of the Entity Framework, the overall system architecture, and the underlying technologies are described below.

Introduction

Modern applications require data management services in all tiers. They need to handle increasingly richer forms of data which includes not only structured business data (such as Customers and Orders), but also semi-structured and unstructured content such as email, calendars, files, and documents. These applications need to integrate data from multiple data sources as well as to collect, cleanse, transform and store this data to enable a more agile decision making process. Developers of these applications need data access, programming and development tools to increase their productivity. While relational databases have become the de facto store for most structured data, there tends to be a mismatch—the well-known impedance mismatch problem—between the data model (and capabilities) exposed by such databases, and the modeling capabilities needed by applications.

Two other factors also play an important part in enterprise system design. First, the data representation for applications tends to evolve differently from that of the underlying databases. Second, many systems are composed of disparate database back-ends with differing degrees of capability. The application logic in the mid-tier is responsible for data transformations that reconcile these differences and presenting a more uniform view of data. These data transformations quickly become complex. Implementing them, especially when the underlying data needs to be updatable, is a hard problem and adds complexity to the application. A significant portion of application development—up to 40% in some cases—is dedicated to writing custom data access logic to work around these problems.

The same problems exist, and are no less severe, for data-centric services. Conventional services such as query, updates, and transactions have been implemented at the logical schema (relational) level. However, the vast majority of newer services, such as replication and analysis, best operate on artifacts typically associated with a higher-level, conceptual data model. For example, SQL SERVER® Replication invented a structure called "logical record" to represent a limited form of entity. Similarly, SQL Server Reporting Services builds reports on top of an entity-like data model called semantic data model language (SDML). Each of these services has custom tools to define conceptual entities and map them down to relational tables—a Customer entity will therefore need to be defined and mapped one way for replication, another way for report building, yet another way for other analysis services and so on. As with applications, each service typically ends up building a custom solution to this problem, and consequently, there is code duplication and limited interoperability between these services.

Object-to-relational mapping (ORM) technologies such as HIBERNATE® and ORACLE TOPLINK® are a popular alternative to custom data access logic. The mappings between the database and applications are expressed in a custom structure, or via schema annotations. These custom structures may seem similar to a conceptual model; however, applications cannot program directly against this conceptual model. While the mappings provide a degree of independence between the database and the application, the problem of handling multiple applications with slightly differing views of the same data (e.g. consider two applications that want to look at different projections of a Customer entity), or of the needs of services which tend to be more dynamic (a priori class generation techniques do not work well for data services, since the underlying database may evolve quicker) are not well addressed by these solutions.

The ADO.NET Entity Framework is a platform for programming against data that significantly reduces the impedance mismatch for applications and data-centric services. It differs from other systems and solutions in at least the following respects:

1. The Entity Framework defines a rich conceptual data model (the Entity Data Model, or the EDM), and a new data manipulation language (Entity SQL) that operates on instances of this model. Like SQL, the EDM is value-based i.e. the EDM defines the structural aspects of entities, and not the behaviors (or methods).

2. This model is made concrete by a runtime that includes a middleware mapping engine supporting powerful bidirectional (EDM—Relational) mappings for queries and updates.

3. Applications and services may program directly against the value-based conceptual layer, or against programming-language-specific object abstractions that may be layered over the conceptual (entity) abstraction, providing ORM-like functionality. We believe a value-based EDM conceptual abstraction is a more flexible basis for sharing data among applications and data-centric services than objects.

4. Finally, the Entity Framework leverages Microsoft's new Language Integrated Query (LINQ) technologies that extend programming languages natively with query expressions to further reduce, and for some scenarios completely eliminate, the impedance mismatch for applications.

The ADO.NET Entity Framework can be incorporated into a larger framework such as the Microsoft .NET Framework.

The rest of this description of a data access architecture, in the context of an ADO.NET Entity Framework embodiment, is organized as follows. The "motivation" section provides additional motivation for the Entity Framework. The "Entity Framework" section presents the Entity Framework and the Entity Data Model. The "Programming Patterns" section describes programming patterns for the Entity Framework. The "Object Services" section outlines the Object Services module. The "Mapping" section focuses on the Mapping component of the Entity Framework, while the "Query Processing" and "Update Processing" sections explain how queries and updates are handled. The "Metadata" and "Tools" describe the metadata subsystem and the tools components of the Entity Framework.

Motivation

This section discusses why a higher level data modeling layer has become essential for applications and data-centric services.

Information Levels in Data Applications

Today's dominant information modeling methodologies for producing database designs factor an information model into four main levels: Physical, Logical (Relational), Conceptual, and Programming/Presentation.

The physical model describes how data is represented in physical resources such as memory, wire or disk. The vocabulary of concepts discussed at this layer includes record formats, file partitions and groups, heaps, and indexes. The physical model is typically invisible to the application—changes to the physical model should not impact application logic, but may impact application performance.

The logical data model is a complete and precise information model of the target domain. The relational model is the representation of choice for most logical data models. The concepts discussed at the logical level include tables, rows, primary-key/foreign-key constraints, and normalization. While normalization helps to achieve data consistency, increased concurrency, and better OLTP performance, it also introduces significant challenges for applications. Normalized data at the logical level is often too fragmented and application logic needs to assemble rows from multiple tables into higher level entities that more closely resemble the artifacts of the application domain.

The conceptual model captures the core information entities from the problem domain and their relationships. A well-known conceptual model is the Entity-Relationship Model introduced by Peter Chen in 1976. UML is a more recent example of a conceptual model. Most applications involve a conceptual design phase early in the application development lifecycle. Unfortunately, however, the conceptual data model diagrams stay "pinned to a wall" growing increasingly disjoint from the reality of the application implementation with time. An important goal of the Entity Framework is to make the conceptual data model (embodied by the Entity Data Model described in the next section) a concrete, programmable abstraction of the data platform.

The programming/presentation model describes how the entities and relationships of the conceptual model need to be manifested (presented) in different forms based on the task at hand. Some entities need to be transformed into programming language objects to implement application business logic; others need to be transformed into XML streams for web service invocations; still others need to be transformed into in-memory structures such as lists or dictionaries for the purposes of user-interface data binding. Naturally, there is no universal programming model or presentation form; thus, applications need flexible mechanisms to transform entities into the various presentation forms.

Most applications and data-centric services would like to reason in terms of high-level concepts such as an Order, not about the several tables that an order may be normalized over in a relational database schema. An order may manifest itself at the presentation/programming level as a class instance in Visual Basic or C# encapsulating the state and logic associated with the order, or as an XML stream for communicating with a web service. There is no one proper presentation model; the real value is in providing a concrete conceptual model, and then being able to use that model as the basis for flexible mappings to and from various presentation models and other higher level data services.

Evolution of Applications and Services

Data-based applications 10-20 years ago were typically structured as data monoliths; closed systems with logic factored by verb-object functions (e.g., create-order, update-customer) that interacted with a database system at the logical schema level. Several significant trends have shaped the way that modern data-based applications are factored and deployed today. Chief among these are object-oriented factoring, service level application composition, and higher level data-centric services. Conceptual entities are an important part of today's applications. These entities must be mapped to a variety of representations and bound to a variety of services. There is no one correct representation or service binding: XML, Relational and Object representations are all important, but no single one suffices for all applications. There is a need, therefore, for a framework that supports a higher-level data modeling layer, and also allows multiple presentation layers to be plugged in—the Entity Framework aims to fulfill these requirements.

Data-centric services have also been evolving in a similar fashion. The services provided by a "data platform" 20 years ago were minimal and focused around the logical schema in an RDBMS. These services included query and update, atomic transactions, and bulk operations such as backup and load/extract.

SQL Server itself is evolving from a traditional RDBMS to a complete data platform that provides a number of high value data-centric services over entities realized at the conceptual schema level. Several higher-level data-centric services in the SQL Server product—Replication, Report Builder to name just a couple—are increasingly delivering their services at the conceptual schema level. Currently, each of these services has a separate tool to describe conceptual entities and map them down to the underlying logical schema level. The goal of the Entity Framework is to provide a common, higher-level conceptual abstraction that all of these services can share.

The Entity Framework

Microsoft's ADO.NET framework that existed prior to the Entity Framework described herein was a data-access technology that enabled applications to connect to data stores and manipulate data contained in them in various ways. It was part of the Microsoft .NET Framework and it was highly integrated with the rest of the .NET Framework class library. The prior ADO.NET framework had two major parts: providers and services. ADO.NET providers are the components that know how to talk to specific data stores. Providers are composed of three core pieces of functionality: connections manage access to the underlying data source; commands represent a command (query, procedure call, etc.) to be executed against the data source; and data readers represent the result of command execution. ADO.NET services include provider-neutral components such as DataSet to enable offline data programming scenarios. (A DataSet is a memory-resident representation of data that provides a consistent relational programming model regardless of the data source.)

Entity Framework—Overview

The ADO .NET Entity Framework builds on the pre-existing existing ADO.NET provider model, and adds the following functionality:

1. A new conceptual data model, the Entity Data Model (EDM), to help model conceptual schemas.

2. A new data manipulation language (DML), Entity SQL, to manipulate instances of the EDM, and a programmatic representation of a query (canonical command trees) to communicate with different providers.

3. The ability to define mappings between the conceptual schema and the logical schemas.

4. An ADO.NET provider programming model against the conceptual schema.

5. An object services layer to provide ORM-like functionality.

6. Integration with LINQ technology to make it easy to program against data as objects from .NET languages.

The Entity Data Model

The Entity Data Model (EDM) is intended for developing rich data-centric applications. It extends the classic relational model with concepts from the E-R domain. Organizational concepts in the EDM include entities and relationships. Entities represent top-level items with identity, while Relationships are used to relate (or, describe relationships between) two or more entities.

The EDM is value-based like the relational model (and SQL), rather than object/reference-based like C# (CLR). Several object programming models can be easily layered on top of the EDM. Similarly, the EDM can map to one or more DBMS implementations for persistence.

The EDM and Entity SQL represent a richer data model and data manipulation language for a data platform and are intended to enable applications such as CRM and ERP, data-intensive services such as Reporting, Business Intelligence, Replication and Synchronization, and data-intensive applications to model and manipulate data at a level of structure and semantics that is closer to their needs. We now discuss various concepts pertaining to the EDM.

EDM Types

An EntityType describes the structure of an entity. An entity may have zero or more properties (attributes, fields) that describe the structure of the entity. Additionally, an entity type must define a key—a set of properties whose values uniquely identify the entity instance within a collection of entities. An EntityType may derive from (or subtype) another entity type—the EDM supports a single inheritance model. The properties of an entity may be simple or complex types. A SimpleType represents scalar (or atomic) types (e.g., integer, string), while a ComplexType represents structured properties (e.g., an Address). A ComplexType is composed of zero or more properties, which may themselves be scalar or complex type properties. A RelationshipType describes relationships between two (or more) entity types. EDM Schemas provide a grouping mechanism for types—types must be defined in a schema. The namespace of the schema combined with the type name uniquely identifies the specific type.

EDM Instance Model

Entity instances (or just entities) are logically contained within an EntitySet. An EntitySet is a homogeneous collection of entities, i.e., all entities in an EntitySet must be of the same (or derived) EntityType. An EntitySet is conceptually similar to a database table, while an entity is similar to a row of a table. An entity instance must belong to exactly one entity set. In a similar fashion, relationship instances are logically contained within a RelationshipSet. The definition of a RelationshipSet scopes the relationship. That is, it identifies the EntitySets that hold instances of the entity types that participate in the relationship. A RelationshipSet is conceptually similar to a link-table in a database. SimpleTypes and ComplexTypes can only be instantiated as properties of an EntityType. An EntityContainer is a logical grouping of EntitySets and RelationshipSets—akin to how a Schema is a grouping mechanism for EDM types.

An Example EDM Schema

A sample EDM schema is shown below:

```
<?xml version="1.0" encoding="utf-8"?>
<Schema Namespace="AdventureWorks" Alias="Self" ...>
    <EntityContainer Name="AdventureWorksContainer">
        <EntitySet Name="ESalesOrders"
                EntityType="Self.ESalesOrder" />
        <EntitySet Name="ESalesPersons"
                EntityType="Self.ESalesPerson" />
        <AssociationSet Name="ESalesPersonOrders"
                Association="Self.ESalesPersonOrder">
            <End Role="ESalesPerson"
```

-continued

```
        EntitySet="ESalesPersons" />
      <End Role="EOrder" EntitySet="ESalesOrders" />
    </AssociationSet>
  </EntityContainer>
  <!-- Sales Order Type Hierarchy-->
  <EntityType Name="ESalesOrder" Key="Id">
    <Property Name="Id" Type="Int32"
        Nullable="false" />
    <Property Name="AccountNum" Type="String"
        MaxLength="15" />
  </EntityType>
  <EntityType Name="EStoreSalesOrder"
        BaseType="Self.ESalesOrder">
    <Property Name="Tax" Type="Decimal"
        Precision="28" Scale="4" />
  </EntityType>
  <!-- Person EntityType -->
  <EntityType Name="ESalesPerson" Key="Id">
    <!-- Properties from SSalesPersons table-->
    <Property Name="Id" Type="Int32"
        Nullable="false" />
    <Property Name="Bonus" Type="Decimal"
        Precision="28" Scale="4" />
    <!-- Properties from SEmployees table-->
    <Property Name="Title" Type="String"
        MaxLength="50" />
    <Property Name="HireDate" Type="DateTime" />
    <!-- Properties from the SContacts table-->
    <Property Name="Name" Type="String"
        MaxLength="50" />
    <Property Name="Contact" Type="Self.ContactInfo"
        Nullable="false" />
  </EntityType>
  <ComplexType Name="ContactInfo">
    <Property Name="Email" Type="String"
        MaxLength="50" />
    <Property Name="Phone" Type="String"
        MaxLength="25" />
  </ComplexType>
  <Association Name="ESalesPersonOrder">
    <End Role="EOrder" Type="Self.ESalesOrder"
        Multiplicity="*" />
    <End Role="ESalesPerson" Multiplicity="1"
        Type="Self.ESalesPerson" />
  </Association>
</Schema>
```

High-Level Architecture

This section outlines the architecture of the ADO.NET Entity Framework. Its main functional components are illustrated in FIG. 1 and comprise the following:

Data source-specific providers. The Entity Framework 100 builds on the ADO.NET data provider model. There are specific providers 122-125 for several data sources such as SQL Server 151, 152, relational sources 153, non-relational 154, and Web services 155 sources. The providers 122-125 can be called from a store-specific ADO.NET Provider API 121.

EntityClient provider. The EntityClient provider 110 represents a concrete conceptual programming layer. It is a new, value-based data provider where data is accessed in terms of EDM entities and relationships and is queried/updated using an entity-based SQL language (Entity SQL). The EntityClient provider 111 forms part of an Entity Data Services 110 package that may also include metadata services 112, a query and update pipeline 113, transactions support 115, a view manager runtime 116, and a view mapping subsystem 114 that supports updatable EDM views over flat relational tables. The mapping between tables and entities is specified declaratively via a mapping specification language.

Object Services and other Programming Layers. The Object Services component 131 of the Entity Framework 100 provides a rich object abstraction over entities, a rich set of services over these objects, and allows applications to program in an imperative coding experience 161 using familiar programming language constructs. This component provides state management services for objects (including change tracking, identity resolution), supports services for navigating and loading objects and relationships, supports queries via LINQ and Entity SQL using components such as Xlinq 132, and allows objects to be updated and persisted.

The Entity Framework allows multiple programming layers akin to 130 to be plugged onto the value-based entity data services layer 110 exposed by the EntityClient provider 111. The Object Services 130 component is one such programming layer that surfaces CLR objects, and provides ORM-like functionality.

The Metadata services 112 component manages metadata for the design time and runtime needs of the Entity Framework 100, and applications over the Entity Framework. All metadata associated with EDM concepts (entities, relationships, EntitySets, RelationshipSets), store concepts (tables, columns, constraints), and mapping concepts are exposed via metadata interfaces. The metadata component 112 also serves as a link between the domain modeling tools which support model-driven application design.

Design and Metadata Tools. The Entity Framework 100 integrates with domain designers 170 to enable model-driven application development. The tools include EDM design tools, modeling tools, 171, mapping design tools 172, browsing design tools 173, binding design tools 174, code generation tools 175, and query modelers.

Services. Rich data-centric services such as Reporting 141, .Synchronization 142, Web Services 143 and Business Analysis can be built using the Entity Framework 100.

Programming Patterns

The ADO.NET Entity Framework together with LINQ increases application developer productivity by significantly reducing the impedance mismatch between application code and data. In this section we describe the evolution in data access programming patterns at the logical, conceptual and object abstraction layers.

Figure 2:
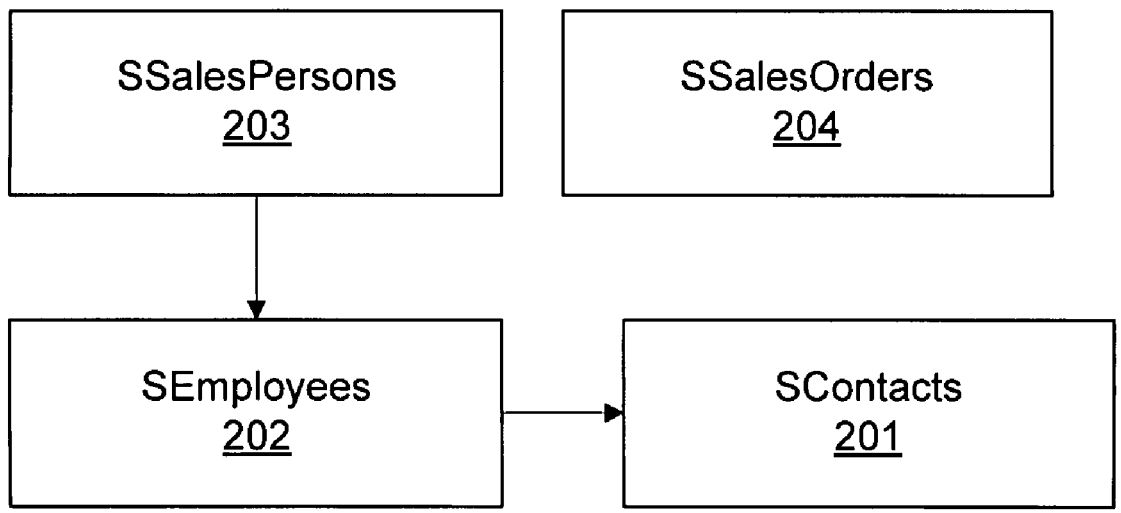
FIG. 2 illustrates an exemplary relational schema.

Consider the following relational schema fragment based on the sample AdventureWorks database. This database consists of SContacts 201, SEmployees 202, SSalesPersons 203, and SSalesOrders 204 tables, which may follow a relational schema such as that illustrated in FIG. 2.

```
SContacts (ContactId, Name, Email, Phone)
SEmployees (EmployeeId, Title, HireDate)
SSalesPersons (SalesPersonId, Bonus)
SSalesOrders (SalesOrderId, SalesPersonId)
```

Consider an application code fragment to obtain the name and hired date of salespeople who were hired prior to some date (shown below). There are four main shortcomings in this code fragment that have little to do with the business question that needs to be answered. First, even though the query can be stated in English very succinctly, the SQL statement is quite verbose and requires the developer to be aware of the normalized relational schema to formulate the multi-table join required to collect the appropriate columns from the SContacts, SEmployees, and SSalesPerson tables. Additionally, any change to the underlying database schemas will require corresponding changes in the code fragment below. Second, the user has to define an explicit connection to the data source. Third, since the results returned are not strongly typed, any reference to non-existing columns names will be caught only after the query has executed. Fourth, the SQL statement is a string property to the Command API and any errors in its formulation will be only caught at execution time. While this code is written using ADO.NET 2.0, the code pattern and its shortcomings applies to any other relational data access API such as ODBC, JDBC, or OLE-DB.

Application code fragment:

```
void EmpsByDate(DateTime date) {
using( SqlConnection con =
     new Sqlconnection (CONN_STRING) ) {
        con.Open( );
        SqlCommand cmd = con.CreateCommand( );
        cmd.CommandText = @"
        SELECT SalesPersonID, FirstName, HireDate
        FROM SSalesPersons sp
            INNER JOIN SEmployees e
            ON sp.SalesPersonID = e.EmployeeID
        INNER JOIN SContacts c
            ON e.EmployeeID = c.ContactID
        WHERE e.HireDate < @date";
        cmd.Parameters.AddWithValue("@date",date);
        DbDataReader r = cmd.ExecuteReader( );
        while(r.Read( )) {
            Console.WriteLine("{0:d}:\t{1}",
                r["HireDate"], r["FirstName"]);
}}}
```

Figure 3:
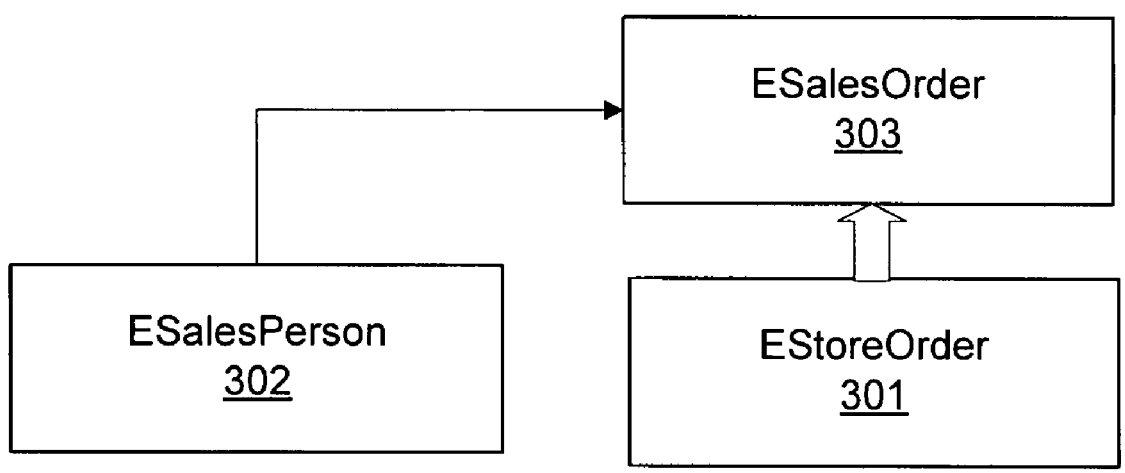
FIG. 3 illustrates an exemplary Entity Data Model (EDM) schema.

The sample relational schema can be captured at the conceptual level via an EDM schema, as illustrated in FIG. 3. It defines an entity type ESalesPerson 302 that abstracts out the fragmentation of SContacts 201, SEmployees 202, and SSalesPersons 203 tables. It also captures the inheritance relationship between the EStoreOrder 301 and ESalesOrder 303 entity types.

The equivalent program at the conceptual layer is written as follows:

```
void EmpsByDate (DateTime date) {
using( EntityConnection con =
   new EntityConnection (CONN_STRING) ) {
     con.Open( );
     EntityCommand cmd = con.CreateCommand( );
     cmd.CommandText = @"
       SELECT VALUE sp
       FROM ESalesPersons sp
       WHERE sp.HireDate < @date";
     cmd.Parameters.AddWithValue ("date",
        date);
        DbDataReader r = cmd.ExecuteReader(
           CommandBehavior.SequentialAccess);
     while (r.Read( )) {
        Console.WriteLine("{0:d}:\t{1}",
            r["HireDate"]], r["FirstName"])
}}}
```

The SQL statement has been considerably simplified—the user no longer has to know about the precise database layout. Furthermore, the application logic can be isolated from changes to the underlying database schema. However, this fragment is still string-based, still does not get the benefits of programming language type-checking, and returns weakly typed results.

By adding a thin object wrapper around entities and using the Language Integrated Query (LINQ) extensions in C#, one can rewrite the equivalent function with no impedance mismatch as follows:

```
void EmpsByDate(DateTime date) {
    using (AdventureWorksDB aw =
        new AdventureWorksDB( )) {
        var people = from p in aw.SalesPersons
            where p.HireDate < date
            select p;
        foreach (SalesPerson p in people) {
            Console.WriteLine("{0:d}\t{1}",
                p.HireDate, p.FirstName);
}}}
```

The query is simple; the application is (largely) isolated from changes to the underlying database schema; and the query is fully type-checked by the C# compiler. In addition to queries, one can interact with objects and perform regular Create, Read, Update and Delete (CRUD) operations on the objects. Examples of these are described in the Update Processing section.

Object Services

The Object Services component is a programming/presentation layer over the conceptual (entity) layer. It houses several components that facilitate the interaction between the programming language and the value-based conceptual layer entities. We expect one object service to exist per programming language runtime (e.g., .NET, Java). If it is designed to support the .NET CLR, programs in any .NET language can interact with the Entity Framework. Object Services is composed of the following major components:

The ObjectContext class houses the database connection, metadata workspace, object state manager, and object materializer. This class includes an object query interface ObjectQuery<T> to enable the formulation of queries in either Entity SQL or LINQ syntax, and returns strongly-typed object results as an ObjectReader<T>. The ObjectContext also exposes query and update (i.e., SaveChanges) object-level interfaces between the programming language layer and the conceptual layer. The Object state manager has three main functions: (a) cache query results, providing identity resolution, and managing policies to merge objects from overlapping query results, (b) track in-memory changes, and (c) construct the change list input to the update processing infrastructure (see Sec. 8). The object state manager maintains the state of each entity in the cache—detached (from the cache), added, unchanged, modified, and deleted—and tracks their state transitions. The Object materializer performs the transformations during query and update between entity values from the conceptual layer and the corresponding CLR objects.

Mapping

The backbone of a general-purpose data access layer such as the ADO.NET Entity Framework is a mapping that establishes a relationship between the application data and the data stored in the database. An application queries and updates data at the object or conceptual level and these operations are translated to the store via the mapping. There are a number of technical challenges that have to be addressed by any mapping solution. It is relatively straightforward to build an ORM that uses a one-to-one mapping to expose each row in a relational table as an object, especially if no declarative data manipulation is required. However, as more complex mappings, set-based operations, performance, multi-DBMS-vendor support, and other requirements weigh in, ad hoc solutions quickly grow out of hand.

Problem: Updates via Mappings

The problem of accessing data via mappings can be modeled in terms of "views", i.e., the objects/entities in the client layer can be considered as rich views over the table rows. However, it is well known that only a limited class of views is updateable, e.g., commercial database systems do not allow updates to multiple tables in views containing joins or unions. Finding a unique update translation over even quite simple views is rarely possible due to the intrinsic under-specification of the update behavior by a view. Research has shown that teasing out the update semantics from views is hard and can require significant user expertise. However, for mapping-driven data access, it is advantageous that there exists a well-defined translation of every update to the view.

Furthermore, in mapping-driven scenarios, the updatability requirement goes beyond a single view. For example, a business application that manipulates Customer and Order entities effectively performs operations against two views. Sometimes a consistent application state can only be achieved by updating several views simultaneously. Case-by-case translation of such updates may yield a combinatorial explosion of the update logic. Delegating its implementation to application developers is unsatisfactory because it requires them to manually tackle one of the most complicated parts of data access.

The ADO.NET Mapping Approach

The ADO.NET Entity Framework supports an innovative mapping architecture that aims to address the above challenges. It exploits the following ideas:

1. Specification: Mappings are specified using a declarative language that has well-defined semantics and puts a wide range of mapping scenarios within reach of non-expert users.

2. Compilation: Mappings are compiled into bidirectional views, called query and update views, that drive query and update processing in the runtime engine.

3. Execution: Update translation is done using a general mechanism that leverages materialized view maintenance, a robust database technology. Query translation uses view unfolding.

The new mapping architecture enables building a powerful stack of mapping-driven technologies in a principled, future-proof way. Moreover, it opens up interesting research directions of immediate practical relevance. The following subsections illustrate the specification and compilation of mappings. Execution is considered in the Query Processing and Update Processing sections, below.

Specification of Mappings

A mapping is specified using a set of mapping fragments. Each mapping fragment is a constraint of the form $Q_{Entities} = Q_{Tables}$ where $Q_{Entities}$ is a query over the entity schema (on the application side) and $Q_{Tables}$ is a query over the database schema (on the store side). A mapping fragment describes how a portion of entity data corresponds to a portion of relational data. That is, a mapping fragment is an elementary unit of specification that can be understood independently of other fragments.

Figure 4:
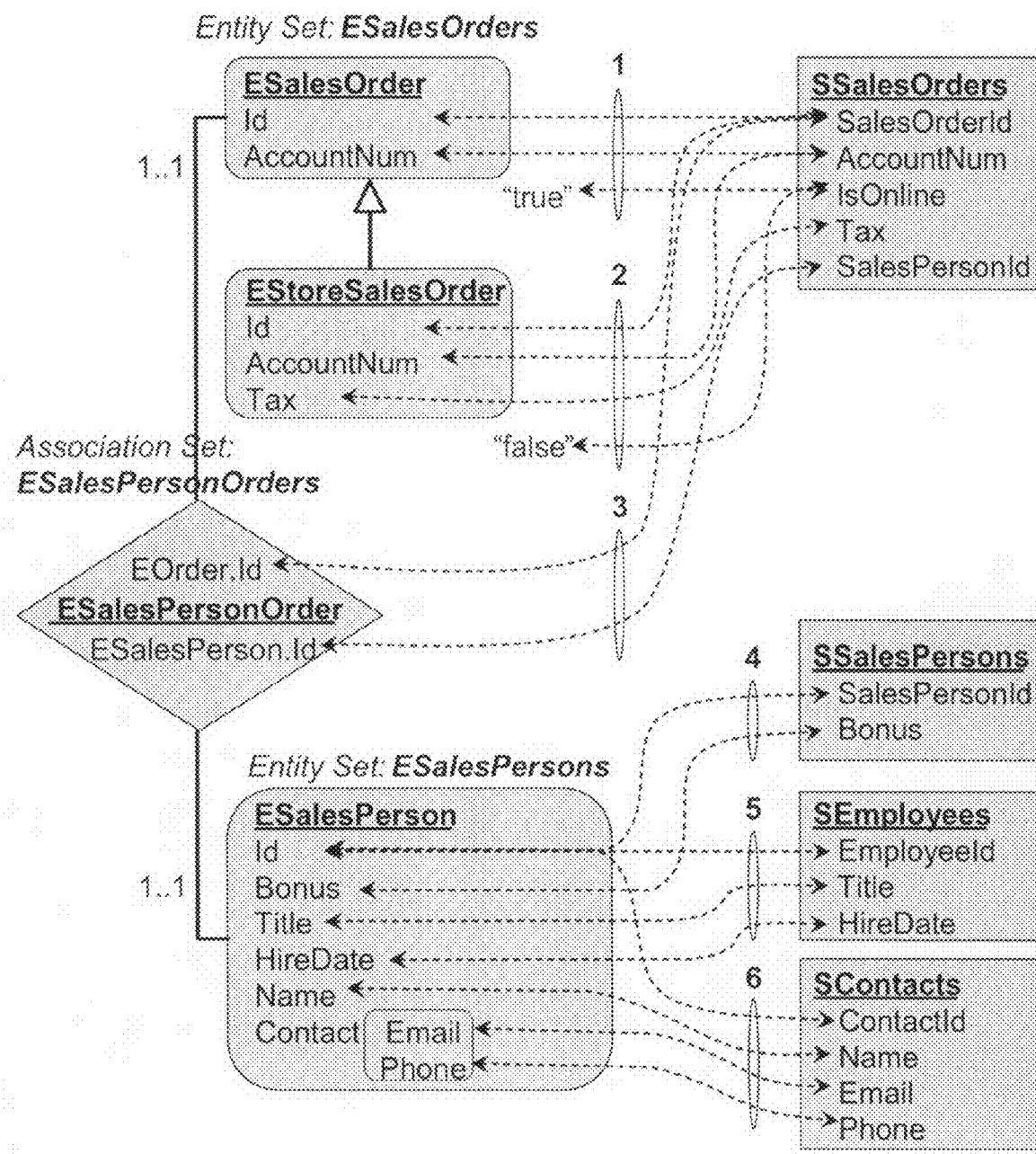
FIG. 4 illustrates a mapping between and entity schema (left) and a database schema (right).

To illustrate, consider the sample mapping scenario in FIG. 4. FIG. 4 illustrates a mapping between and entity schema (left) and a database schema (right). The mapping can be defined using an XML file or a graphical tool. The entity schema corresponds to the one in the Entity Data Model section herein. On the store side there are four tables, SSalesOrders,: SSalesPersons, SEmployees, and SContacts.

The mapping is represented in terms of queries: on the entity schema and the relational schema as shown in FIG. 5.

In FIG. 5, Fragment 1 says that the set of (Id, AccountNum) values for all entities of exact type ESalesOrder in ESalesOrders is identical to the set of (SalesOrderId, AccountNum) values retrieved from the SSalesOrders table for which IsOnline is true. Fragment 2 is similar. Fragment 3 maps the association set ESalesPersonOrders to the SSalesOrders table and says that each association entry corresponds to the primary key, foreign key pair for each row in this table. Fragments 4, 5, and 6 say that the entities in the ESalesPersons entity set are split across three tables SSalesPersons, SContacts, SEmployees.

Bidirectional Views

The mappings are compiled into bidirectional Entity SQL views that drive the runtime. The query views express entities in terms of tables, while the update views express tables in terms of entities.

Update views may be somewhat counterintuitive because they specify persistent data in terms of virtual constructs, but as we show later, they can be leveraged for supporting updates in an elegant way. The generated views 'respect' the mapping in a well-defined sense and have the following properties (note that the presentation is slightly simplified—in particular, the persistent state is not completely determined by the virtual state):

Entities=QueryViews(Tables)

Tables=UpdateViews(Entities)

Entities=QueryViews(UpdateViews(Entities))

The last condition is the roundtripping criterion, which ensures that all entity data can be persisted and reassembled from the database in a lossless fashion. The mapping compiler included in the Entity Framework guarantees that the generated views satisfy the roundtripping criterion. It raises an error if no such views can be produced from the input mapping.

FIG. 6 shows the bidirectional views—the query and update views—generated by the mapping compiler for the mapping in FIG. 5. In general, the views are significantly more complex than the input mapping, as they explicitly specify the required data transformations. For example, in $QV_1$ the ESalesOrders entity set is constructed from the SSalesOrders table so that either an ESalesOrder or an EStoreSalesOrder is instantiated depending on whether or not the IsOnline flag is true. To reassemble the ESalesPersons entity set from the relational tables, one needs to perform a join between SSalesPersons, SEmployees, and SContacts tables ($QV_3$).

Writing query and update views by hand that satisfy the roundtripping criterion is tricky and requires significant database expertise; therefore, present embodiments of the Entity Framework only accept the views produced by the built-in mapping compiler, although accepting views produced by other compilers or by hand is certainly plausible in alternative embodiments.

Mapping Compiler

The Entity Framework contains a mapping compiler that generates the query and update views from the EDM schema, the store schema, and the mapping (the metadata artifacts are discussed in the Metadata section herein). These views are consumed by the query and update pipelines. The compiler can be invoked either at design time or at runtime when the first query is executed against the EDM schema. The view generation algorithms used in the compiler are based on the answering-queries-using-views techniques for exact rewritings. These algorithms and their implementation in a computer system to produce a useful, concrete and tangible result are explored in detail below in the section entitled "Further Aspects and Embodiments."

Query Processing

Query Languages

The Entity Framework is designed to work with multiple query languages. We describe Entity SQL and LINQ embodiments in more detail herein, understanding that the same or similar principles can be extended to other embodiments.

Entity SQL

Entity SQL is a derivative of SQL designed to query and manipulate EDM instances. Entity SQL extends standard SQL in the following ways.

1. Native support for EDM constructs (entities, relationships, complex types etc.): constructors, member accessors, type interrogation, relationship navigation, nest/unnest etc.

2. Namespaces. Entity SQL uses namespaces as a grouping construct for types and functions (similar to XQuery and other programming languages).

3. Extensible functions. Entity SQL supports no built-in functions. All functions (min, max, substring, etc.) are defined externally in a namespace, and imported into a query, usually from the underlying store.

4. More orthogonal treatment of sub-queries and other constructs as compared to SQL.

The Entity Framework supports Entity SQL as the query language at the EntityClient provider layer, and in the Object Services component. A sample Entity SQL query is shown in the Programming Patterns section herein.

Language Integrated Query (LINQ)

Language-integrated query, or LINQ, is an innovation in .NET programming languages that introduces query-related constructs to mainstream programming languages such as C# and Visual Basic. The query expressions are not processed by an external tool or language pre-processor but instead are first-class expressions of the languages themselves. LINQ allows query expressions to benefit from the rich metadata, compile-time syntax checking, static typing and IntelliSense that was previously available only to imperative code. LINQ defines a set of general-purpose standard query operators that allow traversal, filter, join, projection, sorting and grouping operations to be expressed in a direct yet declarative way in any .NET-based programming language. .NET Languages such as Visual Basic and C# also support query comprehensions—language syntax extensions that leverage the standard query operators. An example query using LINQ in C# is shown in the Programming Patterns section herein.

Canonical Command Trees

Canonical Command Trees—more simply, command trees—are the programmatic (tree) representation of all queries in the Entity Framework. Queries expressed via Entity SQL or LINQ are first parsed and converted into command trees; all subsequent processing is performed on the command trees. The Entity Framework also allows queries to be dynamically constructed (or edited) via command tree construction/edit APIs. Command trees may represent queries, inserts, updates, deletes, and procedure calls. A command tree is composed of one or more Expressions. An Expression simply represents some computation—the Entity Framework provides a variety of expressions including constants, parameters, arithmetic operations, relational operations (projection, filter, joins etc.), function calls and so on. Finally, command trees are used as the means of communication for queries between the EntityClient provider and the underlying store-specific provider.

Query Pipeline

Query execution in the Entity Framework is delegated to the data stores. The query processing infrastructure of the Entity Framework is responsible for breaking down an Entity SQL or LINQ query into one or more elementary, relational-only queries that can be evaluated by the underlying store, along with additional assembly information, which is used to reshape the flat results of the simpler queries into the richer EDM structures.

The Entity Framework assumes that stores must support capabilities similar to that of SQL Server 2000. Queries are broken down into simpler flat-relational queries that fit this profile. Future releases of the Entity Framework will allow stores to take on larger parts of query processing.

A typical query is processed as follows.

Syntax and Semantic Analysis. An Entity SQL query is first parsed and semantically analyzed using information from the Metadata services component. LINQ queries are parsed and analyzed as part of the appropriate language compiler.

Conversion to a Canonical Command Tree. The query is now converted into a command tree, regardless of how it was originally expressed, and validated.

Mapping View Unfolding. Queries in the Entity Framework target the conceptual (EDM) schemas. These queries must be translated to reference the underlying database tables and views instead. This process—referred to as mapping view unfolding—is analogous to the view unfolding mechanism in database systems. The mappings between the EDM schema and the database schema are compiled into query and update views. The query view is then unfolded in the user query—the query now targets the database tables and views.

Structured Type Elimination. All references to structured types are now eliminated from the query, and added to the reassembly information (to guide result assembly). This includes references to type constructors, member accessors, type interrogation expressions.

Projection Pruning. The query is analyzed, and unreferenced expressions in the query are eliminated.

Nest Pull-up. Any nesting operations (constructing nested collections) in the query are pushed up to the root of the query tree over a sub-tree containing only flat relational operators. Typically, the nesting operation is transformed into a left outer join (or an outer apply), and the flat results from the ensuing query are then reassembled (see Result Assembly below) into the appropriate results.

Transformations. A set of heuristic transformations are applied to simplify the query. These include filter pushdowns, apply to join conversions, case expression folding, etc. Redundant joins (self-joins, primary-key, foreign-key joins) are eliminated at this stage. Note that the query processing infrastructure here does not perform any cost-based optimization.

Translation into Provider-Specific Commands.: The query (i.e., command tree) is now handed off to providers to produce a provider-specific command, possibly in the providers' native SQL dialect. We refer to this step as SQLGen.

Execution. The provider commands are executed.

Result Assembly. The results (DataReaders) from the providers are then reshaped into the appropriate form using the assembly information gathered earlier, and a single DataReader is returned to the caller.

Materialization. For queries issued via the Object Services component, the results are then materialized into the appropriate programming language objects.

SQLGen

As mentioned in the previous section, query execution is delegated to the underlying store. The query must first be translated into a form that is appropriate for the store. However, different stores support different dialects of SQL, and it is infeasible for the Entity Framework to natively support all of them. The query pipeline hands over a query in the form of a command tree to the store provider. The store provider must translate the command tree into a native command. This is usually accomplished by translating the command tree into the provider's native SQL dialect—hence the term SQLGen for this phase. The resulting command can then be executed to produce the relevant results. In addition to working against various versions of SQL Server, the Entity Framework is being integrated with various third-party ADO.NET providers for DB2, Oracle, and MySQL.

Update Processing

This section describes how update processing is performed in the ADO.NET Entity Framework. There are two phases to update processing, compile time and runtime. In the Bidirectional Views section provided herein, we described the process of compiling the mapping specification into a collection of view expressions. This section describes how these view expressions are exploited at runtime to translate the object modifications performed at the object layer (or Entity SQL DML updates at the EDM layer) into equivalent SQL updates at the relational layer.

Updates via View Maintenance

One of the insights exploited in the ADO.NET mapping architecture is that materialized view maintenance algorithms can be leveraged to propagate updates through bidirectional views. This process is illustrated in FIG. 7.

Figure 7:
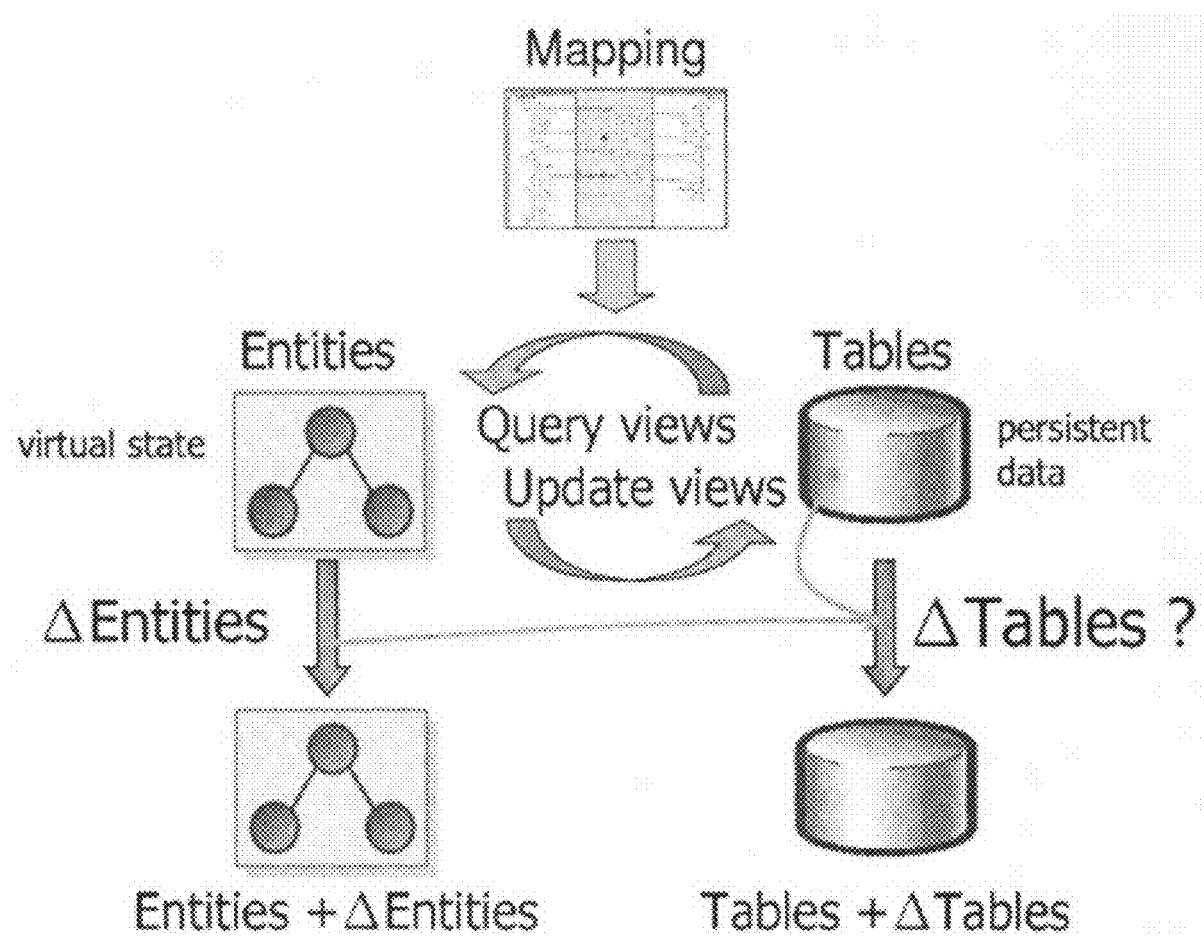
FIG. 7 illustrates a process for leveraging materialized view maintenance algorithms to propagate updates through bidirectional views.

Tables inside a database, as illustrated on the right hand side of FIG. 7, hold persistent data. An EntityContainer, as illustrated on the left side of FIG. 7, represents a virtual state of this persistent data since typically only a tiny fraction of the entities in the EntitySets are materialized on the client. The goal is to translate an update ΔEntities on the state of Entities into an update ΔTables on the persistent state of Tables. This process is referred to as incremental view maintenance, because the update is performed based on an update ΔEntities representing the changed aspects of an entity.

This can be done using the following two steps:
1. View maintenance:
ΔTables=ΔUpdateViews(Entities, ΔEntities)
2. View unfolding:
ΔTables=ΔUpdateViews (QueryViews(Tables), ΔEntities)

In Step 1, view maintenance algorithms are applied to update views. This produces a set of delta expressions, ΔUpdateViews, which tell us how to obtain ΔTables from ΔEntities and a snapshot of Entities. Since the latter is not fully materialized on the client, in Step 2 view unfolding is used to combine the delta expressions with query views. Together, these steps generate an expression that takes as input the initial database state and the update to entities, and computes the update to the database.

This approach yields a clean, uniform algorithm that works for both object-at-a-time and set-based updates (i.e., those expressed using data manipulation statements), and leverages robust database technology. In practice, Step 1 is often sufficient for update translation since many updates do not directly depend on the current database state; in those situations we have ΔTables=ΔUpdateViews(ΔEntities). If ΔEntities is given as a set of object-at-a-time modifications on cached entities, then Step 1 can be further optimized by executing view maintenance algorithms directly on the modified entities rather than computing the ΔUpdateViews expression.

Translating Updates on Objects

To illustrate the approach outlined above, consider the following example which gives a bonus and promotion to eligible salespeople who have been with the company for at least 5 years.

```
using(AdventureWorksDB aw =
    new AdventureWorksDB(...)) {
    // People hired at least 5 years ago
    Datetime d = DateTime.Today.AddYears (−5);
    var people = from p in aw.SalesPeople
        where p.HireDate < d
        select p;
    foreach(SalesPerson p in people) {
        if(HRWebService.ReadyForPromotion(p)) {
            p.Bonus += 10;
            p.Title = "Senior Sales Representative";
        }
    }
    aw.SaveChanges( ); // push changes to DB
}
```

AdventureWorksDB is a tool-generated class that derives from a generic object services class, called ObjectContext, that houses the database connection, metadata workspace, and object cache data structure and exposes the SaveChanges method. As we explained in the Object Services section, the object cache maintains a list of entities, each of which is in one of the following states: detached (from the cache), added, unchanged, modified, and deleted. The above code fragment describes an update that modifies the title and bonus properties of ESalesPerson objects which are stored in the SEmployees and SSalesPersons tables, respectively. The process of transforming the object updates into the corresponding table updates triggered by the call to the SaveChanges method may comprise the following four steps:

Change List Generation. A list of changes per entity set is created from the object cache. Updates are represented as lists of deleted and inserted elements. Added objects become inserts. Deleted objects become deletes.

Value Expression Propagation. This step takes the list of changes and the update views (kept in the metadata workspace) and, using incremental materialized view maintenance expressions ΔUpdateViews, transforms the list of object changes into a sequence of algebraic base table insert and delete expressions against the underlying affected tables. For this example, the relevant update views are $UV_2$ and $UV_3$ shown in FIG. 6. These views are simple project-select queries, so applying view maintenance rules is straightforward. We obtain the following ΔUpdateViews expressions, which are the same for insertions ($\Delta^+$) and deletions ($\Delta^-$):

| ΔSSalesPersons = | SELECT p.Id, p.Bonus FROM ΔESalesPersons AS p |
|---|---|
| ΔSEmployees = | SELECT p.Id, p.Title FROM ΔESalesPersons AS p |
| ΔSContacts = | SELECT p.Id, p.Name, p.Contact.Email, p.Contact.Phone FROM ΔESalesPersons AS p |

Suppose the loop shown above updated the entity $E_{old}$=ESalesPersons(1, 20, "", "Alice", contact("a@sales", NULL)) to $E_{new}$=EsalesPersons(1, 30, "Senior...", "Alice", contact("a@sales", NULL)). Then, the initial delta is $\Delta^+$ESalesOrders=$\{E_{new}\}$ for insertions and $\Delta^-$ESalesOrders=$\{E_{old}\}$ for deletions. We obtain $\Delta^+$SSalesPersons=$\{(1, 30)\}$, $\Delta^-$SSalesPersons=$\{(1, 20)\}$. The computed insertions and deletions on the SSalesPersons table are then combined into a single update that sets the Bonus value to 30. The deltas on SEmployees are computed analogously. For SContacts, we get $\Delta^+$SContacts=$\Delta^-$SContacts, so no update is required.

In addition to computing the deltas on the affected base tables, this phase is responsible for (a) the correct ordering in which the table updates must be performed, taking into consideration referential integrity constraints, (b) retrieval of store-generated keys needed prior to submitting the final updates to the database, and (c) gathering the information for optimistic concurrency control.

SQL DML or Stored Procedure Calls Generation. This step transforms the list of inserted and deleted deltas plus additional annotations related to concurrency handling into a sequence of SQL DML statements or stored procedure calls. In this example, the update statements generated for the affected salesperson are:

```
BEGIN TRANSACTION
UPDATE [dbo].[SSalesPersons] SET [Bonus]=30
WHERE [SalesPersonID]=1
UPDATE [dbo].[SEmployees]
SET [Title]= N'Senior Sales Representative'
WHERE [EmployeeID]=1
END TRANSACTION
```

Cache Synchronization. Once updates have been performed, the state of the cache is synchronized with the new state of the database. Thus, if necessary, a mini-query-processing step is performed to transform the new modified relational state to its corresponding entity and object state.

Metadata

The metadata subsystem is analogous to a database catalog, and is designed to satisfy the design-time and runtime metadata needs of the Entity Framework.

Metadata Artifacts

Metadata artifacts may include the following:

Conceptual Schema (CSDL files): The conceptual schema is usually defined in a CSDL file (Conceptual Schema Definition Language) and contains the EDM types (entity types, relationships) and entity sets that describes the application's conceptual view of the data.

Store Schema (SSDL files): The store schema information (tables, columns, keys etc.) are expressed using CSDL vocabulary terms. For example, EntitySets denote tables, and properties denote columns. Usually, these are defined in an SSDL (Store Schema Definition Language) file.

C-S Mapping Specification (MSL file): The mapping between the conceptual schema and the store schema is captured in a mapping specification, typically in an MSL file (Mapping Specification Language). This specification is used by the mapping compiler to produce the query and update views.

Provider Manifest: The Provider Manifest is a description of functionality supported by each provider, and includes information about:

1. The primitive types (varchar, int, etc.) supported by the provider, and the EDM types (string, int32, etc.) they correspond to.

2. The built-in functions (and their signatures) for the provider.

This information is used by the Entity SQL parser as part of query analysis. In addition to these artifacts, the metadata subsystem also keeps track of the generated object classes, and the mappings between these and the corresponding conceptual entity types.

Metadata Services Architecture

The metadata consumed by the Entity Framework comes from different sources in different formats. The metadata subsystem is built over a set of unified low-level metadata interfaces that allow the metadata runtime to work independently of the details of the different metadata persistent formats/sources.

The metadata services include:
Enumeration of different types of metadata.
Metadata search by key.
Metadata browsing/navigation.
Creation of transient metadata (e.g., for query processing).
Session independent metadata caching and reusing.

The metadata subsystem includes the following components. The metadata cache caches metadata retrieved from different sources, and provides consumers a common API to retrieve and manipulate the metadata. Since the metadata may be represented in different forms, and stored in different locations, the metadata subsystem supports a loader interface. Metadata loaders implement the loader interface, and are responsible for loading the metadata from the appropriate source (CSDL/SSDL files etc.). A metadata workspace aggregates several pieces of metadata to provide the complete set of metadata for an application. A metadata workspace usually contains information about the conceptual model, the store schema, the object classes, and the mappings between these constructs.

Tools

The Entity Framework includes a collection of design-time tools to increase development productivity.

Model designer: One of the early steps in the development of an application is the definition of a conceptual model. The Entity Framework allows application designers and analysts to describe the main concepts of their application in terms of entities and relationships. The model designer is a tool that allows this conceptual modeling task to be performed interactively. The artifacts of the design are captured directly in the Metadata component which may persist its state in the database. The model designer can also generate and consume model descriptions (specified via CSDL), and can synthesize EDM models from relational metadata.

Figure 8:
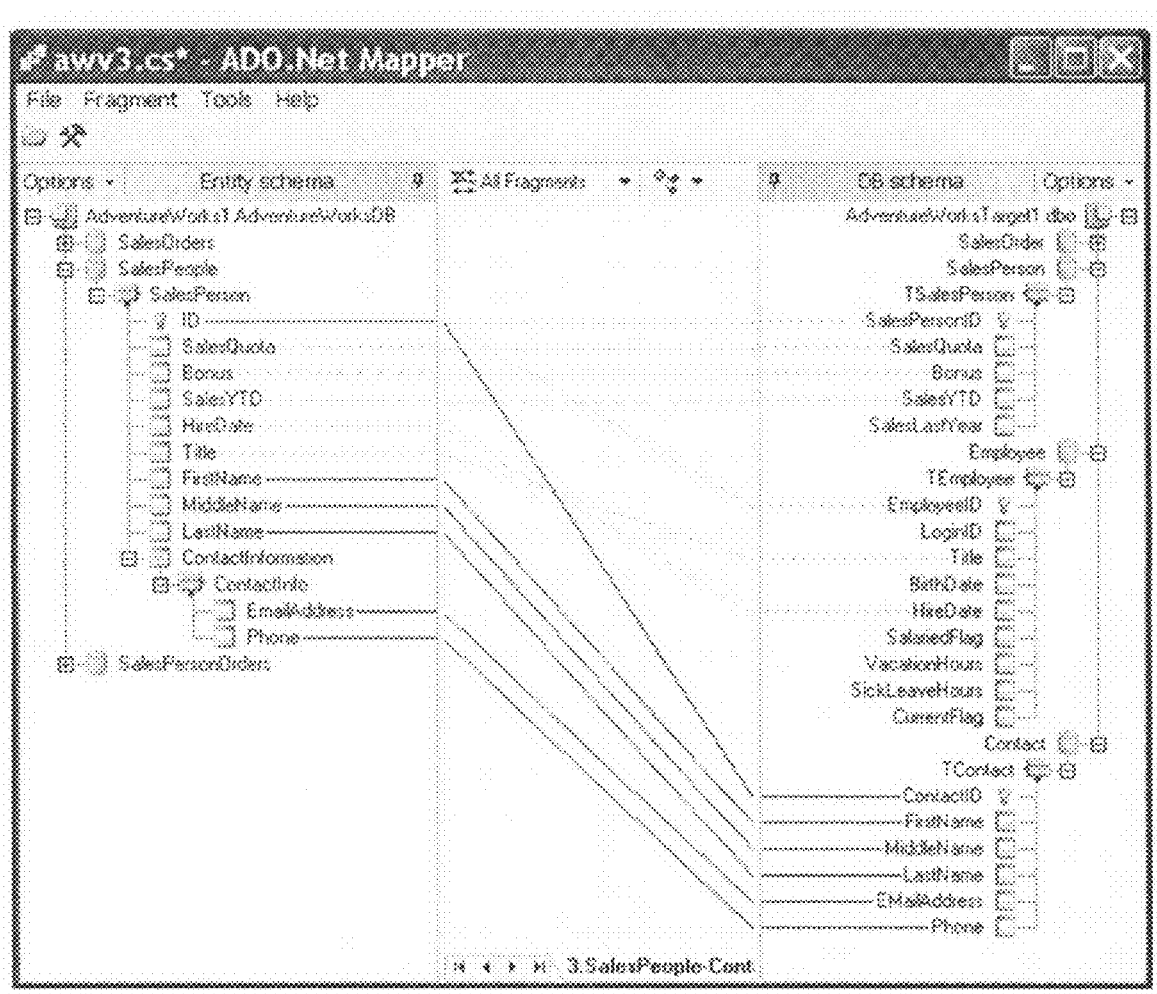
FIG. 8 illustrates a mapping designer user interface.

Mapping designer: Once an EDM model has been designed, the developer may specify how a conceptual model maps to a relational database. This task is facilitated by the mapping designer, which may present a user interface as illustrated in FIG. 8. The mapping designer helps developers describe how entities and relationships in an entity schema presented on the left hand side of the user interface map to tables and columns in the database, as reflected in a database schema presented on the right side of the user-interface in FIG. 8. The links in the graph presented in the middle section of FIG. 8 visualize the mapping expressions specified declaratively as equalities of Entity SQL queries. These expressions become the input to the bidirectional mapping compilation component which generates the query and update views.

Code generation: The EDM conceptual model is sufficient for many applications as it provides a familiar interaction model based on ADO.NET code patterns (commands, connections, data readers). However, many applications prefer to interact with data as strongly-typed objects. The Entity Framework includes a set of code generation tools that take EDM models as input and produce strongly-typed CLR classes for entity types. The code generation tools can also generate a strongly-typed object context (e.g., Adventure-WorksDB) which exposes strongly typed collections for all entity and relationship sets defined by the model (e.g., ObjectQuery<SalesPerson>).

Further Aspects and Embodiments

In a system as described above, generation of query and update views may be accomplished by an appropriately configured computer system using any of a variety of approaches. The purpose of this section is to describe in detail exemplary view generation techniques that may be applied. In this regard, a first section below is directed to exploring the mapping compilation problem, and a second section provides an exemplary view generation algorithm suitable for implementation by electronic computing equipment.

Mapping Compilation Problem

In this section we state the mapping compilation problem formally. We start with a basic problem statement and refine it after introducing merge views. After that we describe a mapping language that may be supported by a mapping compiler in one exemplary embodiment.

Since the data transformation runtime is driven by query and update views, a mapping may not required in every embodiment of the invention. Several alternatives to the mapping compilation approach include: 1. Let the developers supply both query and update views; 2. Obtain query views from update views, and 3. Obtain update views from query views.

The first alternative approach may be problematic because checking the roundtripping criterion for ER-SQL views is undecidable. To see this, consider a trivial query view E=R and an update view R=E−($Q_1$−$Q_2$) where E is an entity set, R is a relational table, and $Q_1$ and $Q_2$ are queries on the entity schema that do not mention E. Unfolding the update view yields the roundtripping condition E=E−($Q_1$−$Q_2$). It holds if and only if $Q_1 \subseteq Q_2$, which is undecidable for any relationally complete language. Although it is possible to restrict the query and update views to a subset of ER-SQL for which containment is decidable, writing them by hand can be difficult and requires significant database expertise.

The second alternative approach, obtaining query views from update views, may also be problematic because it requires testing the injectivity of update views and inverting them, which is also undecidable for ER-SQL, as can be seen using the construction in the paragraph above.

The third alternative, obtaining update views from query views, requires solving the view update problem. Finding a unique update translation for even quite simple (query) views is rarely possible.

Therefore, in the exemplary embodiment described further herein, the mapping compilation approach is described, where query and update views are generated from mappings and are guaranteed to roundtrip. In one embodiment, an Entity Framework only accepts the views produced by a built-in mapping compiler.

Mappings and Data Roundtripping

We start with a general problem statement that makes no assumptions about the languages used for specifying schemas, mappings, and views. To emphasize that, we refer to the entity schema as a 'client' schema and to the relational schema as a 'store' schema.

A schema defines a set of states (also called instances). Let C be the set of valid client states, i.e., all instances satisfying the client schema and all its schema constraints. Similarly, let S be the set of valid store states, i.e., those conforming to the store schema. Occasionally we use the same symbol (C, S, P, etc.) to denote the schema itself, when its role is clear from the context.

A mapping between the client and store schema specifies a binary relation between C states and S states. Set $\Sigma_{map}$ of mapping constraints expressed in some formal language defines the mapping:

$$\text{map} = \{(c, s) \mid (c, s) \in C \times S, (c, s) \models \Sigma_{map}\}$$
We also say that map is given by $\Sigma_{map}$.

The first question that we address is under what conditions a mapping map $\subseteq$ C×S describes a valid data access scenario. One job of the mapping layer is to enable the developer to run queries and updates on the client schema as if it were a regular database schema. That is, the mapping should ensure that each database state of C can be losslessly encoded in S. Hence, each state of C should be mapped to a distinct database state of S, or to a set of database states of S that is disjoint from any other such set. If this condition is satisfied we say that the mapping roundtrips data, denoted as:

$$\text{map} \circ \text{map}^{-1} = Id(C)$$

In other words, the composition of the mapping with its inverse yields the identity mapping on C. Composition, inverse, and range of mappings are defined in a standard way as the respective algebraic operations on binary relations. Notice that map may, in one embodiment, be non-functional. As an example, consider a mapping as illustrated in FIG. 9.

Figure 9:
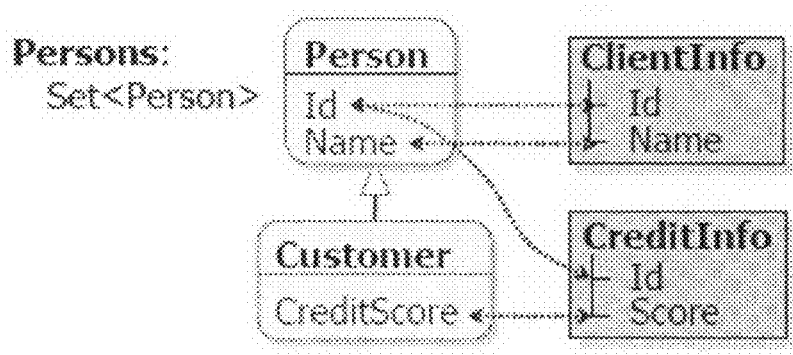
FIG. 9 illustrates depicts an entity schema with entity types Person and Customer whose instances are accessed via the extent Persons.

FIG. 9 depicts an entity schema with entity types Person and Customer whose instances are accessed via the extent Persons. On the store side there are two tables, ClientInfo and CreditInfo, which represent a vertical partitioning of the entity data. The mapping is given by two fragments shown in FIG. 9, and is visualized using lines between schema elements. The first fragment specifies that the set of (Id, Name) values for all entities in Persons is identical to the set of (Id, Name) values retrieved from the ClientInfo table. Similarly, the second fragment tells us that (Id, CreditScore) values for all Customer entities can be obtained from the CreditInfo table.

Consider a mapping as illustrated in FIG. 9 except that CreditInfo table has an extra column Date. This column is not referenced in the mapping constraints. Hence, the client schema provides access to a proper subset of the data in the store, i.e., there exist multiple corresponding store states for each client state.

The next question we consider is what it means to obtain query and update views that roundtrip data and respect the mapping. Our statement of this problem is based on the following theorem:

Theorem 1 (Data Roundtripping)

Let map C $\subseteq$ C×S. Then, map $\circ$ map$^{-1}$=Id(C) if and only if there exist two (total) views, q: S→C and u: C→S, such that u $\subseteq$ map $\subseteq$ q$^{-1}$.

If the views u and q above are given as sets of constraints (or view definitions) $\Sigma_u$ and $\Sigma_q$, then u $\subseteq$ map $\subseteq$ q$^{-1}$ means that $\Sigma_u$ implies $\Sigma_{map}$, which in turn implies $\Sigma_q$ for all instances in C×S. It is easy to show that for each q and u satisfying the above theorem u ◯ q=Id(C), called the roundtripping criterion. Hence, we formulate the following data roundtripping problem:

For a given map $\subseteq$ C×S, construct views q and u expressed in some language L, such that u $\subseteq$ map $\subseteq$ q$^{-1}$, or show that such views do not exist.

We refer to q and u as the query view and update view, respectively. Sometimes, we use the plural form 'views' to emphasize that q and u are specified as sets of view definitions, e.g., as shown in FIG. 10.

Figure 10:
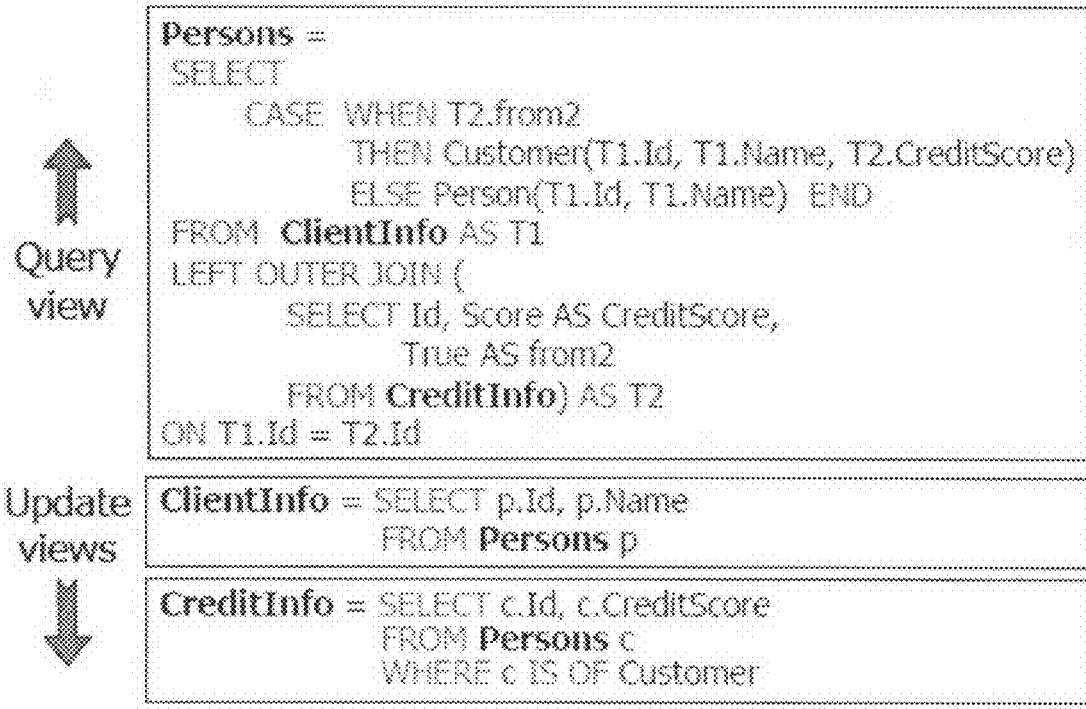
FIG. 10 illustrates query and update views generated by the mapping compiler for the mapping in FIG. 9.

FIG. 10 shows the query and update views generated by the mapping compiler for the mapping in FIG. 9. In general, the views may be significantly more complex than the input mapping, as they explicitly specify the required data transformations. For example, to reassemble the Persons extent from the relational tables, one needs to perform a left outer join between ClientInfo and CreditInfo tables, and instantiate either Customer or Person entities depending on whether or not the respective tuples from CreditInfo participate in the join. In the query pipeline, queries against the entity schema can now be answered by unfolding the query views in the queries, pulling up all non-relational constructs, and sending the relational-only portion of the query to the database server.

Merge views

Figure 11:
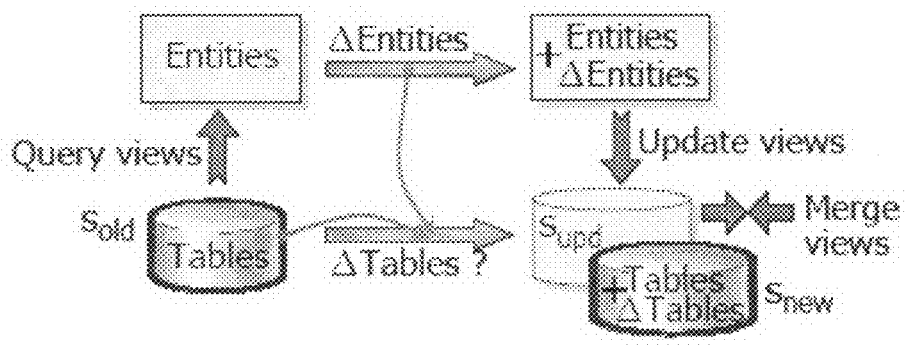
FIG. 11 illustrates a merge view that combines an updated store state computed by a client and an old store state into the new store state.

In many mapping scenarios, only part of the store data is accessible through the client schema. Some tables or columns, such as CreditInfo mentioned above, may not be relevant to the application and not exposed through the mapping. Usually, such unexposed information needs to remain intact as updates are performed against the store. To address this requirement, embodiments may leverage the concept of merge views. A merge view m: S×S→S combines the updated store state $S_{upd}$ computed by the client and the old store state sold into the new store state $S_{new}$ (see FIG. 11).

To illustrate, consider the merge view for the extended table CreditInfo (Id, Score, Date):

```
CreditInfo_new = SELECT upd.Id, upd.Score, old.Date
                 FROM CreditInfo AS upd
                 LEFT OUTER JOIN CreditInfo_old AS old
                 ON upd.Id = old.Id
```

The above view together with the query and update views shown in FIG. 10 determine completely the update behavior for the extended CreditInfo table. The left outer join ensures that the new customer entities added on the client appear in the CreditInfo$_{new}$ table, and the deleted ones get removed. If a customer's credit score gets updated, the Date value remains unchanged.

In contrast to query and update views, whose purpose is to reshape data between the client and the store, merge views capture the store-side state transition behavior. This behavior may go beyond preserving unexposed data. For example, if Date denotes the last date on which the credit score was modified, it may be necessary to reset it to the current date upon each update. More generally, merge views may implement various update policies such as updating timestamps, logging updates, resetting certain columns, or rejecting deletions (using full outer join in the merge view).

In one exemplary embodiment, merge views may be used exclusively for preserving unexposed data. The formal criterion can be stated as:

$$\forall s \in \text{Range(map)}: m(u(q(s)),s)=s$$

Such embodiments require that a client that retrieves all store data and writes it back unmodified leaves the store in the unchanged state. This property needs to hold for all mapped store states, i.e., the ones that are consistent with the specified mapping.

The extended roundtripping criterion that takes merge views into account can be stated as:

$$\forall c \in C, \forall s \in \text{Range(map)}: q(m(u(c),s))=c$$

Such embodiments require that applying the update view u to an arbitrary client state c, followed by merging the computed store state with the existing store state, must allow reassembling c using the query view q from the merged store state.

Systems, methods, and computer readable media may thus be configured to adhere to such requirements, or may be configured to verify that such requirements are met.

Bipartite Mappings

The mappings in an exemplary Entity Framework embodiment may be specified using a set of mapping fragments $\Sigma_{map}=\{Q_{C1}=Q_{S1},\ldots,Q_{Cn}=Q_{Sn}\}$. A mapping fragment is a constraint of the form $Q_C=Q_S$ where $Q_C$ is a query over the client schema and $Q_S$ is a query over the store schema. We call such mappings bipartite mappings. A bipartite mapping is one that can be expressed as a composition mapping of a view with an inverse of a view with the same view schema. Thus, the mapping given by $\Sigma_{map}$ above can be expressed as a composition mapping f ○ g$^{-1}$ where the view f: C→V is given by queries $Q_{C1},\ldots,Q_{Cn}$, the view g: S→V is given by queries $Q_{S1},\ldots,Q_{Sn}$, and V corresponds to the view schema $V_1,\ldots,V_n$ induced by these queries (see FIG. 12). We refer to $V_i$ as a fragment view (symbol).

One property of bipartite mappings is using equality in mapping constraints instead of inclusion. Inclusion constraints of the form $Q_{src} \subseteq Q_{tgt}$ used in source-to-target data exchange and query answering settings are inadequate for data roundtripping because they specify a 'one-way' relationship between the schemas. For example, the above query inclusion does not constrain the source database; it may remain empty for each target database.

As we demonstrate shortly, bipartite mappings enable embodiments to compile mappings by applying answering-queries-using-views techniques to the views f and g, one after another. This reduces the complexity of the solution and enables developing largely symmetric algorithms for generating query and update views.

Mapping Language

The bipartite mappings taken as input by the mapping compiler may, in one embodiment, be specified using constraints of the form $Q_C=Q_S$ where $Q_C$ and $Q_S$ are ER-SQL queries. In such embodiments, these queries, which we call fragment queries, are essentially project-select queries with a relational-only output and a limited form of disjunction and negation. This class of mapping constraints allows expressing a large number of mapping scenarios yet is sufficiently simple that mapping compilation can be performed effectively.

The specification of a fragment query Q is given blow:

```
Q ::= SELECT P [, P]* FROM E AS e WHERE C
C ::= C AND C | C OR C | P IS NULL | P IS NOT NULL |
      P = c | P IS OF T | P IS OF (ONLY T)
P ::= e | P.A
```

Where E is an extent with alias e, A is a property of an entity type or complex type, c is a scalar constant, and T is an entity type or a complex type. The return type of Q is required to be a row of scalars and needs to contain the key properties of E.

Figure 13:
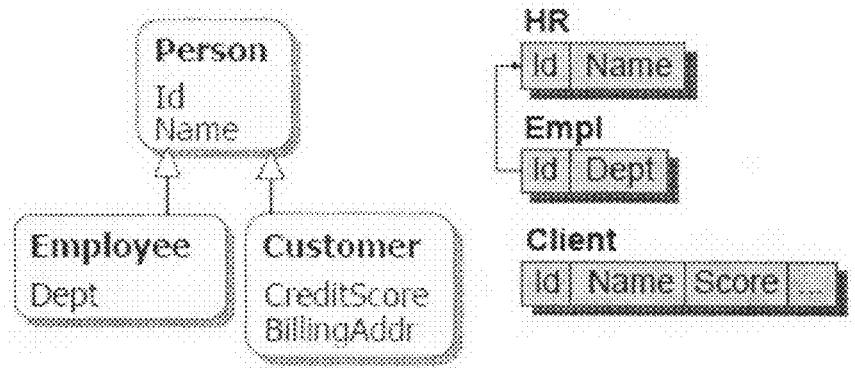

To illustrate why the exemplary mapping language supports disjunction, consider the scenario in FIG. 13. A combination of horizontal and vertical partitioning is used to store the inheritance hierarchy shown on the left. Table HR holds (portions of) instances of Person and Employee, but no Customer instances. The mapping fragment for HR can be specified using OR as shown below. Any other way of expressing the mapping would require using negation or joins:

---
SELECT p.Id, p.Name FROM Persons AS p
WHERE p IS OF (ONLY Person) OR p IS OF (ONLY Employee)
=
SELECT t.Id, t.Name FROM HR AS t

---

The mapping language specified above allows describing most inheritance mapping scenarios proposed in the literature and implemented in commercial products. In particular, it supports table-per-hierarchy, table-per-type (vertical partitioning), table-per-concrete-type (horizontal partitioning) strategies, and all their combinations. Furthermore, it supports entity splitting scenarios where entities are stored in different tables based on certain property values. The various systems provided herein may thus be configured to recognize and operate upon statements specified in the above exemplary mapping language.

Exemplary View Generation Algorithm

A view generation algorithm as may be applied by a computer system implementing an Entity Framework such as that described above is further explored in this section. We start by explaining organizational principles behind the algorithm. One guiding principle that we use in this explanation is reducing the mapping compilation problem to that of finding exact rewritings of queries using views.

Organizational Principles

Consider the problem of obtaining query views from mapping map=$f \circ g^{-1}$. The view f on C and the view g on S are specified as $\{V_1=Q_{C1}, \ldots, V_{Cn}=Q_{Cn}\}$ and $\{V_1=Q_{S1}, \ldots, V_n=Q_{Sn}\}$, respectively. Suppose that the view f is materialized. To preserve all information from C in the materialized view, f must be lossless, i.e., an injective function. f is infective if $f(x)=z$ and $f(y)=z$ implies $x=y$.

In this case, we can reconstruct the state of C from the materialized view by finding an exact rewriting of the identity query on C using the view f. Suppose f': V→C is such a rewriting (depicted as a dashed arrow in FIG. 12), given by a set of queries on $V_1, \ldots, V_n$. Hence, we can unfold g in f' to express C in terms of S. That gives us the desired query view $q=f' \circ g$.

Update views and merge views can be obtained in a similar fashion by answering the identity query on S. The extra subtlety is that g need not be injective and may expose only a portion of the store data through the mapping. This raises two issues. First, the exact rewriting of the identity query on S may not exist. That is, to leverage answering-queries-using-views techniques we need to extract an injective view from g. Second, we need to ensure that the store information not exposed in the mapping can flow back into the update processing in the form of a merge view. Before we present a general solution, consider the following example:

EXAMPLE 1

Suppose that the store schema contains a single relation R(ID, A, B, C). Let map=$f \circ g^{-1}$ where g is defined as:

$$V_1 = \pi_{ID,A}(R)$$

$$V_2 = \pi_{ID,B}(\sigma_{C=3}(R))$$

Figure 14:
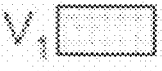
FIG. 14 illustrates an exemplary partitioning of a relational table.

The identity query on R cannot be answered using fragment views $V_1$ and $V_2$ since g is non-injective and loses some information in R. So, we translate the store schema into an equivalent partitioned schema containing relations $P_1^A(\underline{ID}, A), P_1^B(\underline{ID}, B), P_2^A(\underline{ID}, A), P_2^{B,C}(\underline{ID}, B, C)$ with the following schema constraints: for all i≠j, $\pi ID(P_i^X) \cap \pi ID(P_j^Y) = \emptyset$ and $\pi ID(P_i^X) = \pi ID(P_i^Y)$. The partitioning of R is illustrated in FIG. 14. The equivalence between the partitioned schema and the store schema {R} is witnessed by two bijective views p and r, where p is defined as:

$$P_1^A = \pi_{ID,A}(\sigma_{C=3}(R))$$

$$P_1^B = \pi_{ID,B}(\sigma_{C=3}(R))$$

$$P_2^A = \pi_{ID,A}(\sigma_{C \neq 3}(R))$$

$$P_2^{B,C} = \pi_{ID,B,C}(\sigma_{C \neq 3}(R))$$

and r is defined as:

$$R = \pi_{ID,A,B,3}(P_1^A \bowtie P_1^B) \cup (P_2^A \bowtie P_2^{B,C})$$

The above partitioning scheme is chosen in such a way that the view g can be rewritten in terms of union queries on the partitions. Thus, g can be restated in terms of $P_1^A$, $P_1^B$, and $P_2^A$ as follows:

$$V_1 = P_1^A \cup P_2^A$$

$$V_2 = P_1^B$$

We call partitions $P_1^A$, $P_1^B$, $P_2^A$ exposed because they appear in the above rewriting. They are depicted as a shaded region in FIG. 14. Partition $P_2^{B,C}$ is unexposed (white region). Notice that the above rewriting is injective, i.e., information-preserving, on the schema formed by the exposed partitions. Due to the constraint $\pi ID(P_1^A) = \pi ID(P_1^B)$ on the partitioned schema, we can reconstruct the exposed partitions from $V_1$ and $V_2$ as follows, where ⊳ is the left anti-semijoin, and ⟕ is the left outer join:

$$P_1^A = V_1 \bowtie V_2$$

$$P_1^B = V_2$$

$$P_2^A = V_1 \triangleright V_2$$

Figure 12:
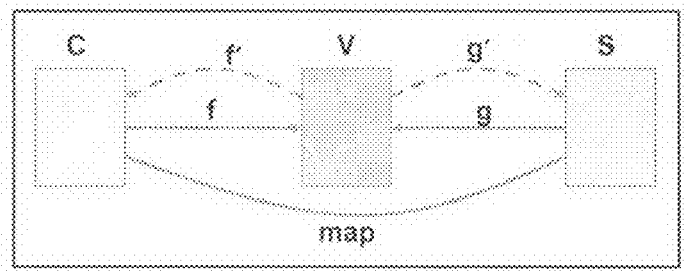
FIG. 12 illustrates a mapping expressed as a composition mapping f, o g$^{-1}$ where the view f: C→V is given by queries $Q_{C1}, \ldots, Q_{Cn}$, the view g: S→V is given by queries $Q_{S1}, \ldots, Q_{Sn}$, and V corresponds to the view schema $V_1, \ldots, V_n$ induced by these queries.

Now we have all the building blocks to construct both g' in FIG. 12 and the merge view. Let $R_{old}$, $R_{new}$, and $R_{upd}$ denote respectively the old state of R in the store, the new state obtained by merging $R_{upd}$ and $R_{old}$, and the updated state of R computed using g'. $R_{upd}$ is populated from the exposed partitions, ignoring the information in the unexposed partitions. We use extended π operator which may contain constants and computed expressions in the projection list:

$$R_{upd} = \pi_{ID, A, B, 3}(P_1^A \bowtie P_1^B) \cup \pi_{ID, A, NULL, NULL}(P_2^A)$$

$$= \pi_{ID, A, B, 3}(V_1 \bowtie V_2) \cup \pi_{ID, A, NULL, NULL}(V_1 \triangleright V_2)$$

Since $\pi ID(p_1^A) = \pi ID(P_1^B)$, so $\pi ID(V_2) \subseteq \pi ID(V_1)$ and $R_{upd}$ can be simplified as follows:

$$R_{upd} = \pi ID, A, B, 3(V_1 \bowtie V_2)$$

The merge view for $R_{new}$ assembles the exposed partitions that carry the updated client state ($R_{upd}$) and the unexposed partitions holding the old store state ($R_{old}$). The goal is to keep as much of the old store information in the unexposed partitions as possible. (Notice that keeping the complete information is undesirable. For example, preserving all of $P_2^{B,C}$ data from the old store state would prevent the client from deleting any tuples from R with C≠3, which are partially visible through $V_1$.) More precisely, the constraint that we exploit is that partition $P_2^{B,C}$ of $R_{old}$ is contained in partition $P_2^{B,C}$ of $R_{new}$ (but is not equivalent to it). Unfolding the definitions of partitions, while replacing R by $R_{upd}$ for all exposed partitions and replacing R by $R_{old}$ for all unexposed partitions, yields:

$$R_{new} = \sigma_{C=3}(R_{upd}) \cup (\pi ID_A(\sigma_{C\neq 3}(R_{upd}))$$
$$\bowtie, \pi ID_{B,C}(\sigma_{C\neq 3}(R_{old})))$$
$$= \pi ID, A, B, CASE \ldots AS\ C\ (R_{upd} \bowtie, R_{old})$$

where the abbreviated case statement is:

CASE WHEN $R_{old}$.ID IS NOT NULL THEN $R_{old}$.C ELSE 3 END

Composing the merge view with g' produces:

$$R_{new} = \pi ID, A, B, CASE \ldots AS\ C(V_1 \bowtie V_2 \bowtie R_{old})$$

Unfolding f (from map=f $\circ$ g$^{-1}$) in the above expression states $V_1$ and $V_2$ in terms of the client schema and produces the final transformation that drives the update pipeline.

The example motivates several issues. First, we need to justify that the above approach produces query, update, and merge views that satisfy the data roundtripping problem. Second, we need to develop a partitioning scheme to express the client and store schema using an equivalent schema that allows rewriting the mapping constraints using union queries. This rewriting simplifies the algorithm for reconstructing partitions and testing injectivity of f when constructing query views. Notice that the choice of the partitioning scheme is sensitive to the mapping language. Third, as we show below, the generated case statements can become quite complex and require careful reasoning. Finally, unfolding f in the expression $V_1 \bowtie V_2$ may require further simplification to avoid gratuitous self-joins and self-unions if for example both terms are queries over the same entity set in the client schema. We discuss each of these issues in the subsequent sections.

Mapping Validation

The approach exemplified in the previous section works if we start with a mapping that roundtrips. To illustrate what can go wrong, suppose that f in Example 1 is given as $\{E_1=V_1, E_2=V_2\}$ for entity sets $E_1$, $E_2$. So, the mapping implies $\pi ID(E_2) \subseteq \pi ID(E_1)$. If this condition is violated for some given $E_1$ and $E_2$, there exists no R that satisfies the mapping. Hence, the mapping does not roundtrip and it is impossible to generate query and update views that store and retrieve data losslessly. To validate that a mapping roundtrips we exploit the following theorem:

Theorem 2

Let map=f $\circ$ g$^{-1}$ be a bipartite mapping. Then the following conditions are equivalent:

$$\text{map} \circ \text{map}^{-1} = Id(C) \quad \quad 1.$$

$$\text{f is injective and Range(f)} \subseteq \text{Range(g)} \quad \quad 2.$$

That is, a mapping roundtrips if and only if f is injective and the range constraints of f (i.e., those inferred from f and the schema constraints in C) imply the range constraints of g (i.e., those inferred from g and the schema constraints in S). The problem of computing the range of a mapping (or a view, as a special case) can be reduced to that of mapping composition. We consider the first part of the mapping validation task, checking the injectivity condition, below. As we show next, this check can be done by exploiting the partitioning scheme.

General Solution

In this section we describe our view generation approach in general terms and show that it solves the data roundtripping problem.

Let P be a schema containing a set of relations (partitions) and a set of constraints $\Sigma_p$. P is a partitioned schema for S relative to a query language L if there exists a procedure that (i) allows rewriting each query g ∈ L on S using a unique set of partitions in P, (ii) each such rewriting is injective on the subschema Pexp formed by the partitions used in the rewriting and the respective constraints from $\Sigma_p$, and (iii) the rewriting of the identity query on S uses all partitions in P. (In Example 1, $P_{exp}$ contains $P_1^A$, $P_1^B$, $P_2^A$ and constraints $\pi ID(P_1^A) = \pi ID(P_1^B)$, $\pi ID(P_1^A) \cap \pi ID(P_2^A) = \emptyset$.)

By (ii) and (iii), there exist bijective views r: P→S, r ∈ L and p: S→P witnessing the equivalence of P and S.

Figure 15:
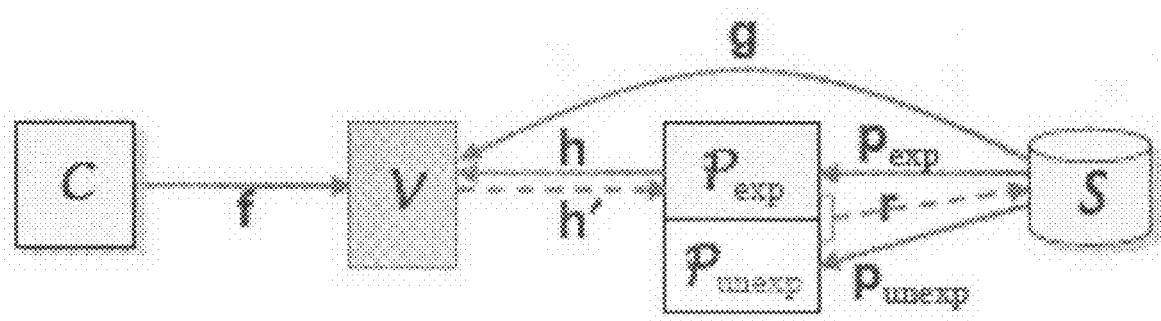
FIG. 15 illustrates a query g that partitions S into $P \subseteq P_{exp} \times P_{unexp}$ such that $p_{exp}: S \rightarrow P_{exp}$ and $p_{unexp}$.

As shown in FIG. 15, query g partitions S into P $\subseteq$ $P_{exp} \times P_{unexp}$ such that $p_{exp}$: S→$P_{exp}$ and $p_{unexp}$: S→$P_{unexp}$ are view complements that together yield p. By condition (ii), g can be rewritten as h $\circ$ $p_{exp}$ where h is injective. Let h' be an exact rewriting of the identity query on $P_{exp}$ using h, i.e., h' reconstructs $P_{exp}$ from V. Then, the update view u and merge view m can be constructed as follows:

$$u := f \circ h' \circ r[., \emptyset]$$

$$m(s_1, s_2) := r(p_{exp}(s_1), p_{unexp}(s_2))$$

where Ø; is the $P_{unexp}$-state where all relations are empty, the view r[.,Ø] is such that r[.,Ø](x)=y iff r(x, Ø)=y, and $s_1$, $s_2$ ∈ S.

Assuming that f is injective and Range(f) $\subseteq$ Range(g), it is easy to show that u and m satisfy the information-preservation condition. The extended roundtripping criterion holds if we choose the view r in such a way that:

$$\forall x \in P_{exp}, \forall s \in S: p_{exp}(r(x, p_{unexp}(s))) = x$$

To obtain such r, in the example above we left-outer-joined exposed partitions with unexposed partitions that agree on keys.

As we explain next, for our mapping and view language it is always possible to obtain the views h, h', $p_{exp}$, $p_{unexp}$, and r that satisfy the conditions stated above. Therefore, our solution is complete in that it allows constructing query, update, and merge views for each given valid mapping.

Due to conditions (i)-(iii), g is injective if and only if $P_{unexp}$ is empty, i.e., has zero partitions. We exploit this property to check the injectivity of f required by Theorem 2. To do that, we swap the sides of the mapping such that f in the above construction takes the place of g, and apply the partitioning scheme to C in a symmetric fashion.

Compilation Steps

Figure 16:
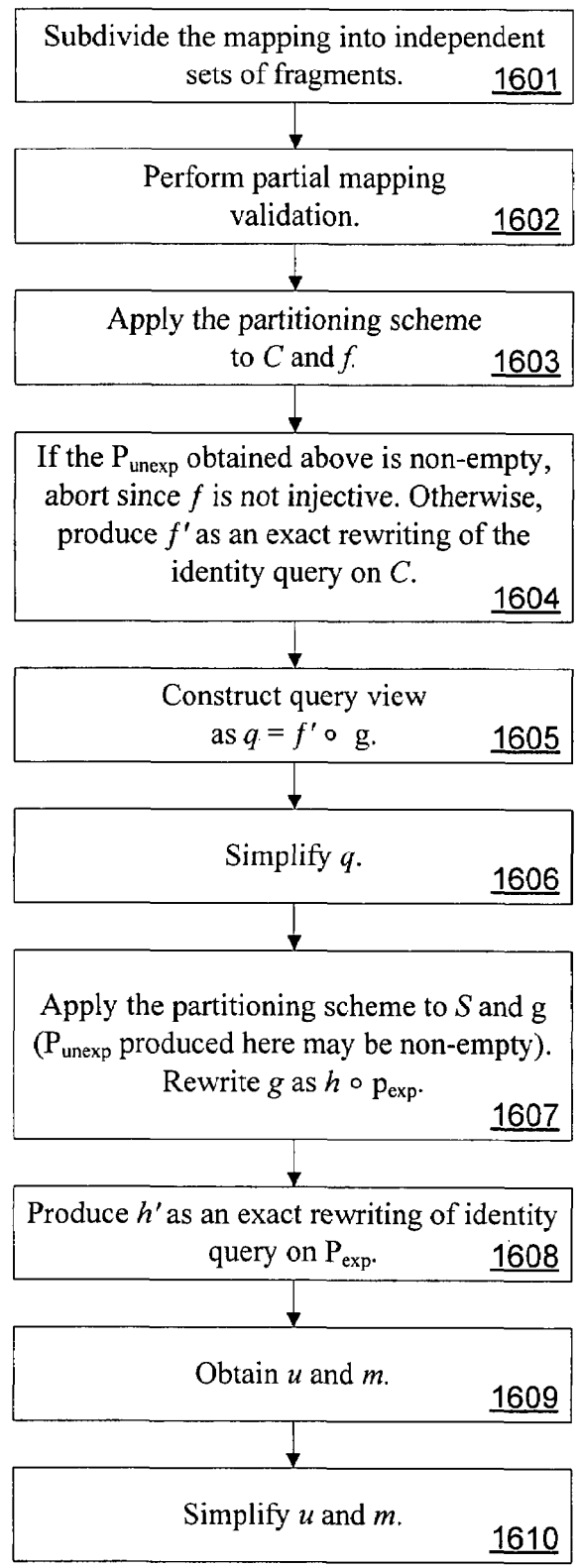
FIG. 16 illustrates exemplary steps of a mapping compilation process.

In summary, in one exemplary embodiment mapping compilation may comprise the following steps, illustrated in FIG. 16, which may be carried out by an appropriately configured computer, as will be appreciated, or encoded in a computer readable medium so as to cause a computer to carry out such steps:

1. Subdivide the mapping into independent sets of fragments 1601.
2. Perform partial mapping validation by checking the condition Range(f) ⊆ Range(g) (using mapping composition techniques) 1602.
3. Apply the partitioning scheme to C and f 1603.
4. If the $P_{unexp}$ obtained above is non-empty, abort since f is not injective. Otherwise, produce f' as an exact rewriting of the identity query on C 1604.
5. Construct query view as q=f' ○ g 1605.
6. Simplify q 1606.
7. Apply the partitioning scheme to S and g ($P_{unexp}$ produced here may be non-empty). Rewrite g as h ○ $p_{exp}$ 1607.
8. Produce h' as an exact rewriting of identity query on $P_{exp}$ 1608.
9. Obtain u and m as shown in the previous section 1609.
10. Simplify u and m 1610.

Step 1 uses a divide-and-conquer method to scope the mapping compilation problem. Two mapping constraints are dependent if their fragment queries share a common extent symbol; in this case, they are placed into the same subset of constraints. All the remaining steps process one such subset of constraints at a time. Steps 3-6 produce query views, while Steps 7-10 produce update and merge views. Next we discuss the partitioning scheme, which is applied in Step 3 and Step 7 of mapping compilation.

Partitioning Scheme

A partitioning scheme allows rewriting the mapping constraints using queries on partitions. Thus, its choice depends directly on the mapping language. Since the fragment queries used in our mapping language are join-free, the partitioning scheme can be applied to one extent at a time. Imagine that the data that belongs to a certain extent is laid out on a 2-dimensional grid along a 'horizontal' and a 'vertical' axis where each point on the vertical axis corresponds to a combination of (a) entity type, (b) complex types appearing in entities, (c) conditions on scalar properties, and (d) is null/is not null conditions on nullable properties; and each point on the horizontal axis corresponds to a single direct or inherited attribute of an entity or complex type.

The partitioning scheme can produce a very large number of partitions if applied directly to the language L of fragment queries defined in the "Mapping Compilation Problem" section, above. Therefore, in one embodiment, the Entity Framework can restrict L to the actual fragment queries appearing in a given mapping map. The partitioning along the vertical axis can be computed using the following recursive algorithm, which is invoked for each extent of type $T_p$. The elementary path to the extent is passed in p:

```
procedure PartitionVertically(p, T_p, map)
    Part := Ø // start with an empty set of partitions
    for each type T that is derived from or equal to T_p do
        P :{ σ_p IS OF (ONLY T)}
        for each direct or inherited member A of T do
            if map contains a condition on p.A then
                if p.A is of primitive type then
                    P := P × Dom(p.A, map)
```

-continued

```
                else if p.A is of complex type T_A then
                    P := P × PartitionVertically(p.A, T_A)
                end if
            end for
            Part := Part ∪ P
        end for
        return Part
```

Each tuple of conditions added to Part is interpreted as a conjunction. Dom(p.A,map) denotes the domain of p.A relative to the mapping map. That is, if p.A is an enumerated or boolean domain, Dom(p.A,map) contains conditions of the form p.A=c for each value c from that domain, and the IS NULL condition if p.A is nullable. Otherwise, Dom(p.A, map) contains equality conditions on all constants appearing in conditions on p.A in any mapping fragment in map, treating NOT NULL conditions as illustrated in the example below.

EXAMPLE 2

Suppose the mapping constraints contain conditions (p=1) and (p IS NOT NULL) on path p of type integer. Then, Dom(p,map):={$\sigma_{cond1}$, $\sigma_{cond2}$, $\sigma_{cond3}$} where:
$cond_1:=(p=1)$
$cond_2:=(p\ IS\ NULL)$
$cond_3:=NOT(p=1\ OR\ p\ IS\ NULL)$ Every pair of conditions in Dom(p,map) is mutually unsatisfiable. ∨ Dom(p,map) is a tautology. Notice that (p IS NOT NULL) is equivalent to ($cond_1$ OR $cond_3$). That is, selection $\sigma_p$ IS NOT NULL(R) can be rewritten as a union query $\sigma_{cond1}$ (R) ∪ $\sigma_{cond3}$ (R).

The following example illustrates how the partitioning algorithm works in presence of complex types:

EXAMPLE 3

Consider an entity schema shown on the left in FIG. 14 where BillingAddr is a nullable property with complex type Address, and Address has a subtype USAddress. Then, the vertical partitioning algorithm produces the following partitions, which list all possible shapes of entities that can appear in the extent:

P1: $\sigma_e$ IS OF (ONLY Person)
P2: $\sigma_e$ IS OF (ONLY Customer) AND e.BillingAddr IS NULL
P3: $\sigma_e$ IS OF (ONLY Customer) AND e.BillingAddr IS OF (ONLY Address)
P4: $\sigma_e$ IS OF (ONLY Customer) AND e.BillingAddr IS OF (ONLY USAddress)
P5: $\sigma_e$ IS OF (ONLY Employee)

Horizontal partitioning is done by splitting each vertical partition in Part according to the properties projected in mapping fragments in map. It is easy to show that the above partitioning scheme allows expressing each fragment query appearing in map as a union query over the produced partitions.

Reconstructing Partitions from Views

We move on to Step 4 and Step 8 of mapping compilation. Let P be the set of partitions constructed in the previous section for a given C or S extent. Let h be a view defined as V=($V_1, \ldots, V_n$) where each fragment view $V_i$ is expressed as a union query over partitions in P. To simplify the notation, each view can be thought of as a set of partitions. Let $P_{exp}=\cup V$ be all partitions that are exposed in views in V. Let the set of non-key attributes of each partition P and view V be denoted as Attr(P) and Attr(V), respectively. If $P_{exp} \neq P$, then h is non-injective. However, even if all partitions are used in V, h may still be non-injective. Injectivity holds only if we can reconstruct each partition $P \in P$ from the views V. One exemplary algorithm that does that is presented below.

```
procedure RecoverPartitions(P_exp,V)
    Sort V by increasing number |V| of partitions per view and
        by decreasing number |Attrs(V)| of attributes per view
    for each partition P ∈ P_exp do
        Pos := Ø; Neg := Ø; // keeps intersected & subtracted views
        Att := Attrs(P); // attributes still missing
        PT := P; // keeps partitions disambiguated so far
        // Phase 1: intersect
        for (i = 1; i __ n and |PT| > 1 and |Att| > 0; i++) do
            if P ∈ V_i then
                Pos := Pos ∪ Vi; PT := PT ∩ V_i
                Att := Att - Attrs(V_i)
            end if
        end for
        // Phase 2: subtract
        for (i = n; i ≧ 1 and |PT| > 1; i--) do
            if P∈ 62 Vi then
                Neg := Neg ∪ V_i; PT := PT ∩ Vi
            end if
        end for
        if |PT| = 1 and |Att| = 0 then
            Recovered[P] := (Pos,Neg)
        end if
    end for
    return
```

The algorithm takes as input the exposed partitions $P_{exp}$ and the fragment views V and constructs an associative table Recovered (at the bottom of the algorithm) that maps a partition P to a set of 'positive' views Pos and 'negative' views Neg. These views, if they exist, can be used to reconstruct P by joining all views in Pos and subtracting (using anti-semi-join) the views in Neg as $P=(\bowtie Pos)\overline{\ltimes}(\cup Neg)$.

The algorithm starts by ordering the views. This step is a heuristic for producing more compact expressions, which may use fewer views. Every set of rewritings produced by the algorithm is equivalent under each view ordering. The set of needed attributes Att represents a horizontal region, while the recovered partitions PT represents the vertical region of the view space. These regions need to be narrowed down to exactly P, for each $P \in P_{exp}$. In Phase 1, we narrow the vertical region by intersecting the views that contain P, while keeping track of the attributes they provide. If joining the views is insufficient to disambiguate P tuples, then in Phase 2, we further narrow the vertical region using anti-semijoins with views that do not contain P. P is fully recovered if PT does not contain any tuples beyond those in P (i.e., |PT|=1) and covers all the required attributes (i.e., |Att|=0). Due to this condition, the algorithm is sound, i.e., each found rewriting is correct.

EXAMPLE 4

Figure 17:
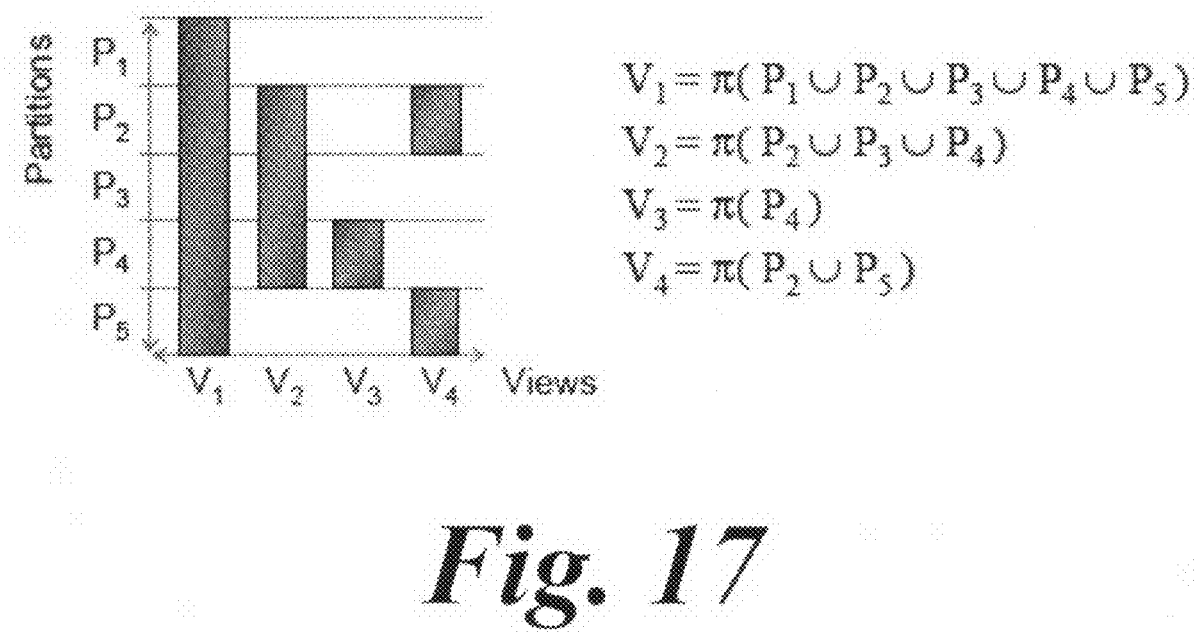
FIG. 17 illustrates exemplary partitions and views for use as an example in the corresponding written specification.

Consider the partitioning scheme in Example 3. Let the rewritten fragment queries used in the mapping be expressed as shown in FIG. 10 (we represent horizontal partitioning by unqualified $\pi$). Sorting yields V=(V3, V4, V2, V1). Suppose that V1 contains an attribute (e.g., Name) that is required by every partition. Then, the algorithm produces (up to projection—$\pi$ is omitted for brevity):

$P1=(V_1)\overline{\ltimes}(V_2 \cup V_4)$ $P2=(V_4 \bowtie V_2 \bowtie V_1)$ $P3=(V_2 \bowtie V_1)\overline{\ltimes}(V_4 \cup V_3)$ $P4=(V_3 \bowtie V_1)$ $P5=(V_4 \overline{\ltimes} V_1)\bowtie(V_2)$ Expanding the view definitions shows that the above rewritings are implied by the expressions in FIG. 17. To illustrate the effect of sorting, notice that view $V_3$ need not be used in the negative part of $P_1$, and $V_2$ does not appear in the positive part of $P_4$, in contrast to using the default sorting $V_1$, $V_2$, $V_3$, $V_4$. To establish the completeness of the algorithm, we need to show that it fails to recover P only if P cannot be reconstructed from V. This result is based on the following theorem. For clarity of exposition, we speak of constants P and sets V while reusing the symbols for partitions and views.

Theorem 3

Let p be a constant from P, and $V=\{V_1, \ldots, V_n\}$ be a set of subsets of P. Then, there exists a relational expression Expr (V1, ..., Vn) such that Expr={p} if and only if:

$$\cap \{V | p \in V, V \in V\} - \cup \{V | p \notin V, V \in V\} = \{p\}$$

The above theorem proves the completeness of the algorithm, but does not guarantee that each found expression is minimal, i.e., uses the smallest possible number of views and/or operators. Finding a minimal solution is equivalent to solving the set cover problem, which is NP-complete. So, the algorithm implements a greedy approach which often produces near-optimal results. Due to sorting, the overall complexity of the algorithm is O(n log n), while Phases 1 and 2 are O(n) in the number of fragment views.

Exploiting Outer Joins

The algorithm RecoverPartitions tells us how to reconstruct each partition P of a given extent. Ultimately, we need to produce a rewriting for the entire extent, which combines multiple partitions. Consider Examples 3 and 4. To obtain the query view for the Persons extent, we could union partitions $P_1, \ldots, P_5$ from Example 4. The resulting expression would use ten relational operators. Instead, embodiments can exploit the following observation. Since each fragment query produces a new view symbol $V_i$ and is join-free, every $V_i$ contains only partitions from a single extent. Therefore, each extent can be reconstructed by doing a full outer join of all the views that contain partitions from that extent. The full-outer-join expression can be further simplified using inclusion and disjointness constraints on the views.

EXAMPLE 5

Let Persons=$\tau$ (E) where $\tau$ is an expression that performs entity construction, fills in required constants, etc. (we talk about it shortly). Then, E can be obtained using the following expressions, all of which are equivalent under the view definitions of FIG. 17:

$$E = P_1 \cup P_2 \cup P_3 \cup P_4 \cup P_5$$
$$= V_1 \fullouterjoin V_2 \fullouterjoin V_3 \fullouterjoin V_4$$
$$(*) = (V_1 \bowtie (V_2 \bowtie V_3)) \leftouterjoin V_4$$
$$(**) = ((V_1 \bowtie V_2) \bowtie (V_3 \cup^a V_4))$$

$\cup^a$ a denotes union without duplicate elimination (UNION ALL). The equivalence can be shown by noticing that the following constraints hold on the views: $V_3 \cap V_4 = \emptyset, V_3 \subseteq V_2 \subseteq V_1, V_4 \subseteq V_1$.

Using full outer joins allows us to construct an expression that is minimal with respect to the number of relational operators: n views are connected using the optimal number of (n−1) binary operators. Still, as illustrated in Example 5, multiple minimal rewritings may exist. In fact, their number grows exponentially with n. As we illustrate in the experimental section, these rewritings may have quite different performance characteristics when they are used to execute queries on the database. One reason is the inability of the optimizer to push down selection predicates through outer joins.

To find a good rewriting that is likely to result in efficient execution plans, we use a heuristic that increases optimization opportunities by replacing outer joins by inner joins and unions. As a side effect, it helps avoid unnecessary joining of data that is known to be disjoint and minimize the size of intermediate query results.

The algorithm we use performs successive grouping of the initial full-outer-join expression using the inclusion and disjointness constraints between the views. The views are arranged into groups, which are relational expressions in the prefix notation. The constraints between groups are tested using set operations on the partitions they contain. Let $\rho(L)$ denote the set of partitions used in all groups and subgroups in L, where L is a sequence of groups. For example, consider a group $G = \bowtie(V_2, V_3)$ containing two views from FIG. 17. We have $\rho(G) = \{P_2, P_3, P_4\}$. The grouping algorithm is shown below.

```
procedure GroupViews(V)
    Arrange V into pairwise disjoint ⋈--groups G_1,...,G_m
    such that each group contains views from a single source extent
        G_v := ⋈(G_1,...,G_m)
    for each group G in G_v do recursively depth-first
        if G = ( ⋈:_,L_1,_,L_2,_ ) and |L_1| > 0 and |L_2| > 0 then
        G_1 = ( ⋈: L_1); G_2 = ( ⋈: L_2)
            if ρ (L_1) ∩ ρ (L_2) = ∅ then G = ⋈(∪^a (G_1,G_2), _ )
            else if ρ (L_1) = ρ (L_2) then G = ⋈(⋈(G_1,G_2), _ )
            else if ρ (L_1) ⊇ ρ (L_2) then G = ⋈( ⋈(G_1,G_2), _)
            else if ρ (L_1) ⊆ ρ (L_2) then G = ⋈( ⋈(G_1,G_2), _)
        end if
    end if
    end for
    Flatten singleton groups in G_v
    return G_v
```

The grouping can be performed by replacing $\bowtie$ by $\cup^a$, $\bowtie$, and $\bowtie$ in that order, where possible. Using $\cup^a$ (UNION ALL) may be critical, in some embodiments, to avoid the sorting overhead upon query execution. The above algorithm does not prescribe the choice of $L_1$ and $L_2$ uniquely. In one exemplary implementation, a greedy approach is used to find 'large' $L_1$ and $L_2$ in linear time, yielding the overall O(n) complexity. We defer the explanation of the very first step of the algorithm, the initial grouping by source extents, to further explanation in subsequent sections below.

Producing CASE Statements

In Example 5, we used the expression $\tau$ to encapsulate constant creation and nonrelational operators that reside on top of a relational expression. In this section we explain how $\tau$ is obtained. Consider the partitions shown in Example 3. Upon assembling the Persons extent from $P_1, \ldots, P_5$ we need to instantiate Persons, Customers, or Employees depending on the partition from which the tuples originate. Thus, all tuples coming from $P_1$ yield Person instances, while all tuples coming from $P_2$ or $P_3$ or $P_4$ produce Customer instances. Furthermore, for all tuples in $P_2$, the BillingAddr property needs to be set to NULL.

Let the boolean variables $b_{P1}, \ldots, b_{P5}$ keep track of the tuple provenance. That is, $b_{P1}$ is true if and only if the tuple comes from $P_1$, etc. Then, we can determine what instances and constants need to be plugged into $\tau$ using a disjunction of $b_P$ variables. This fact is not incidental: it is due to using the partitioning scheme that allows us to rewrite all fragment queries as unions of partitions. Continuing with Example 3, we obtain Persons as:

```
CASE WHEN b_P1 THEN Person(...)
WHEN (b_P2 OR b_P3 OR b_P4 ) THEN Customer(...,
    CASE WHEN bP2 THEN NULL
    WHEN b_P3 THEN Address(...)
    WHEN b_P4 THEN USAddress(...)
    END AS BillingAddr,... )
WHEN b_P5 THEN Employee(...) (E)
``` where E is the relational expression whose construction we discussed in the previous section. By exploiting outer joins we obtained a compact $E = ((V_1 \bowtie V_2) \bowtie (V_3 \cup^a V_4))$. However, now we need to do some extra work to determine the boolean variables $b_{P1}, \ldots, b_{P5}$ from E. That is, the problem is to rewrite $b_P$ variables in terms of $b_V$ variables, where $b_{Vi}$ is true if and only if the tuple originates from $V_i$.

The information needed for this rewriting is delivered by the RecoverPartitions algorithm above. The sets Pos and Neg of intersected and subtracted views directly translate into a Boolean conjunction of positive and negated boolean literals. Hence, continuing Example 4 we obtain:

$$b_{P1} = b_{V1} \wedge \neg b_{V2} \wedge \neg b_{V4}$$

$$b_{P2} = b_{V4} \wedge b_{V2} \wedge b_{V1}$$

$$b_{P3} = b_{V2} \wedge b_{V1} \wedge \neg b_{V4} \wedge \neg b_{V3}$$

$$b_{P4} = b_{V3} \wedge b_{V1}$$

$$b_{P5} = b_{V4} \wedge b_{V1} \wedge \neg b_{V2}$$

The $b_P$ variables in the case statement can now be replaced by their $b_V$ rewritings. The disjunction $(b_{P2} \vee b_{P3} \vee b_{P4})$ can be further compacted using standard boolean optimization techniques. Notice that by exploiting the constraints in FIG. 17 we could obtain an even more optimal rewriting $(b_{P2} \vee b_{P3} \vee b_{P4}) = b_{V2}$, by extending the RecoverPartitions algorithm to consider unions of partitions.

Eliminating Selfjoins and Selfunions

We discuss the final simplification phase of mapping compilation, performed in Step 6 and Step 10.

EXAMPLE 6

Consider constructing query views in Example 5. In Step 5 we expand the view symbols $V_i$ by fragment queries on relational tables. Suppose the fragment queries for $V_2$ and $V_3$ are on the same table, e.g., $V_2 = R$ and $V_3 = \sigma_{A=3}(R)$. If we choose the rewriting (*), then $V_2 \bowtie V_3$ becomes a redundant self-join and can be replaced by R. We obtain:

$$E = (V_1 \bowtie R) \bowtie V_4$$

In contrast, choosing the rewriting (**) gives us:

$$E = (V_1 \bowtie R) \bowtie (\sigma_{A=3}(R) \cup V_4))$$

To bias the algorithm GroupViews toward the top expression above, in its first step we group the fragment views according to their source extents. For query views, source extents are tables; for update views, source extents are those in the entity schema. The main loop of GroupViews preserves this initial grouping.

Eliminating the redundant operations poses an extra complication. As explained in the previous section, we need to keep track of tuple provenance. So, when self-joins and self-unions get collapsed, the boolean variables $b_V$ need to be adjusted accordingly. These boolean variables are initialized in the leaves of the query tree by replacing each $V_i$ by $V_i \times \{\text{True AS } b_{Vi}\}$. In ER-SQL, boolean expressions are first-class citizens and can be returned by queries (see FIG. 10). To preserve their value upon collapsing of redundant operators, we use several rewriting rules, one for each operator. Let $b_1$ and $b_2$ be computed boolean terms, A and B be disjoint lists of attributes, $c_1$ and $c_2$ be boolean conditions, and let:

$$E_1 = \pi_{b1,A,B}(\sigma_{c1}(E))$$

$$E_2 = \pi_{b2,A,C}(\sigma_{c2}(E))$$

Then, the following equivalences hold:

$$E_1 \bowtie_A E_2 = \pi_{b1,b2,A,B,C}(\sigma_{c1 \wedge c2}(E))$$

$$E_1 \rtimes_A E_2 = \pi_{b1,(b2 \wedge c2),A,B,C}(\sigma_{c1}(E))$$

$$E_1 \bowtie_A E_2 = \pi_{(b1 \wedge c1),(b2 \wedge c2),A,B,C}(\sigma_{c1 \vee c2}(E))$$

Observe that if $\pi_A(E \pi_A(E_2)) = \emptyset$ then $E_1 \cup^a E_2 = E_1 \bowtie_A E_2$. The disjointness holds for $\cup^a$ introduced by the GroupViews algorithm because it requires the unioned expressions to assume two-valued boolean logic, where outer joins produce False values instead of NULLs for have non-overlapping keys. Therefore, for $\cup^a$ we can use the same rule as for $\bowtie$.

The presented rules Boolean terms. However, like standard SQL, ER-SQL uses three-valued boolean logic (True, False, NULL). To compensate for it, we translate nullable boolean expressions into non-nullable ones that replace NULLs by False values. This can be done by wrapping a nullable boolean expression b as (b AND (b IS NOT NULL)) or as (CASE WHEN b THEN True ELSE False END).

Exemplary Embodiment

Figure 18:
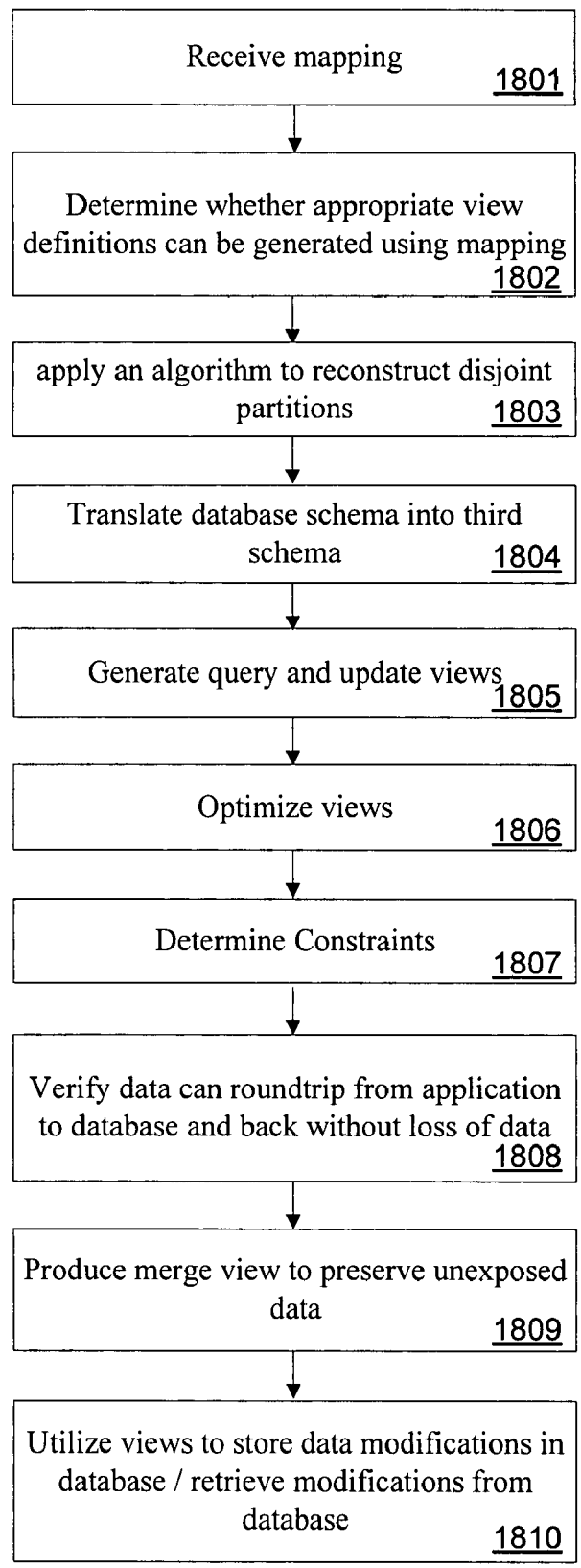
FIG. 18 illustrates an exemplary embodiment including a method that combines a variety of aspects of the disclosure provided herein.

FIG. 18 illustrates steps of an exemplary method as may be performed, not necessarily in the order presented, in one embodiment. All of the steps of FIG. 18 are described in detail above. FIG. 18 merely combines a variety of aspects of the above disclosure for the purpose of a streamlined presentation of such combination. It will be acknowledged that while FIG. 18 illustrates a method, FIG. 18 also represents corresponding computerized subsystems and instructions as may be stored on computer readable media designed to carry out such methods. FIG. 18 may be carried out by electronic subsystems within a system such as presented in FIG. 1, which may comprise a variety of electronic components such as routers, switches, modems, servers, clients and so forth. The steps of FIG. 18 may also be recorded as instructions on computer readable media designed for causing such electronics to carry out the disclosed methods.

FIG. 18 illustrates an exemplary method for providing data services to an application by a data access system. A mapping 1801 may be received, e.g., a mapping associates valid application states corresponding to an application executed by a client computer system with valid database states corresponding to a database in which data for use by said application is stored. The mapping may comprise, in one embodiment, at least one pair of fragment queries comprising a first fragment query stated in terms of an application schema and a second fragment query stated in terms of a database schema. The mapping may comprise a mapping specification which an expression that relates a query on said application schema to a query on said database schema, it may comprise an Extensible Markup Language (XML) document, or it may comprise a query on said application schema and a query on said database schema that is equal to said query on said application schema.

It may be determined 1802 whether said set of query view definitions and said set of update view definitions can be generated from said mapping, such that said set of query view definitions expresses at least a portion of said set of valid application schemas in terms of at least a portion of said set of valid database schemas; said set of update view definitions expresses at least a portion of said set of valid database schemas in terms of at least a portion of said set of valid application schemas; and a composition of said set of query view definitions and said set of update view definitions produces an identity mapping on an application schema.

An algorithm can be applied 1803 to reconstruct disjoint partitions from said set of fragment queries, wherein fragment queries can be rewritten using the said partitions.

In one embodiment, the data access system may translate 1804 a portion of the database schema into a third schema that is equivalent to said portion of a said database schema, and subsequently translate queries initiated by said application into a query over said third schema.

A set of query view definitions and a set of update view definitions are generated 1805 from said mapping, such that the query views determine the application state from a database state, and the update views determine the database state from the application state. In one embodiment, as described herein, said query view definitions are logically implied by the said mapping, which is in turn logically implied by the said update view definitions. Generating said set of query view definitions and said set of update view definitions may comprise, in one embodiment, applying a symmetric algorithm to obtain an exact rewriting of an identity query for an extent.

At least one view within said set of query view definitions or said set of update view definitions can be optimized 1806 by minimizing the number of relational operations required by said at least one view. For example, a view definition can be optimized by replacing an outer join with a union, inner join, or left outer join. A view definition might also be optimized by removing redundant self operations from the view.

Constraints such as key constraints, inclusion constraints, a domain constraints, and disjointness constraints can be determined 1807, and such constraints can be utilized when verifying, by said data access system, that a query initiated by said application according to said application schema can be received by said data access system; modified by said data access system utilizing said mapping specification; performed by said database; and/or requested data returned to said application without loss of said requested data.

It may also be verified that data can roundtrip without loss of data by said data access system 1808, for example by verifying that an update initiated by said application according to said application schema can be received by said data access system; modified by said data access system utilizing said mapping; and performed by said database without loss of update data. It may further be verified that a query subsequently initiated by said application to retrieve said update data can be: received by said data access system; modified by said data access system utilizing said mapping; performed by said database; and update data returned to said application without loss of said update data.

Merge views may be produced 1809 to preserve data in the said database that is not exposed through a mapping to an application.

The set of query view definitions and said set of update view definitions may be utilized 1810 to persist in said database a data modification produced by said client computer system.

In addition to the specific implementations explicitly set forth herein, other aspects and implementations will be apparent to those skilled in the art from consideration of the specification disclosed herein. It is intended that the specification and illustrated implementations be considered as examples only, with a true scope and spirit of the following claims.

What is claimed:

1. A method for providing data services to an application by a data access system, comprising:
   receiving, by said data access system, a mapping specification, said mapping specification correlating an application schema associated with said application with a database schema associated with a database;
   validating, by said data access system, that said mapping specification permits update data to losslessly roundtrip between said application and said database by:
      verifying, by said data access system, that an update initiated by said application according to said application schema can be:
      received by said data access system;
      modified by said data access system utilizing said mapping specification; and
      performed by said database without loss of said update data; and
      verifying, by said data access system, that a query subsequently initiated by said application according to said application schema can be:
      received by said data access system;
      modified by said data access system utilizing said mapping specification;
      performed by said database; and
      said update data returned to said application without loss of said update data;
   upon validating that said mapping specification permits said update data to losslessly roundtrip between said application and said database, approving subsequent use of said mapping specification by said data access system in providing data services to said application.

2. The method of claim 1, wherein said mapping specification comprises an expression that relates a query on said application schema to a query on said database schema.

3. The method of claim 1, wherein said mapping specification comprises an Extensible Markup Language (XML) document.

4. The method of claim 1, wherein said mapping specification comprises a query on said application schema and a query on said database schema that is equal to said query on said application schema.

5. The method of claim 1, further comprising determining a set of constraints comprising one or more of a key constraint, an inclusion constraint, a domain constraint, and a disjointness constraint.

6. The method of claim 5, further comprising utilizing said set of constraints when verifying, by said data access system, that a query initiated by said application according to said application schema can be:
   received by said data access system;
   modified by said data access system utilizing said mapping specification;
   performed by said database; and
   requested data returned to said application without loss of said requested data.

7. The method of claim 1, further comprising translating, by said data access system, a portion of said database schema into a third schema that is equivalent to said portion of a said database schema, and translating a query initiated by said application into a query over said third schema.

8. The method of claim 1, further comprising determining whether a query view and an update view can be produced from said mapping specification, such that:
   said query view expresses at least a portion of said application schema in terms of at least a portion of said database schema;
   said update view expresses at least a portion of said database schema in terms of at least a portion of said application schema;
   a composition of said query view and said update view produces an identity mapping on said application schema.

* * * * *